US006631351B1

(12) United States Patent
Ramachandran et al.

(10) Patent No.: US 6,631,351 B1
(45) Date of Patent: Oct. 7, 2003

(54) SMART TOYS

(75) Inventors: Surya Ramachandran, Oak Park, IL (US); Anand Kancherlapalli, Oak Park, IL (US); Michael C. Fu, Sunnyvale, CA (US)

(73) Assignee: Aidentity Matrix, Elmhurst, IL (US)

( * ) Notice: Subject to any disclaimer, the term of this patent is extended or adjusted under 35 U.S.C. 154(b) by 214 days.

(21) Appl. No.: 09/661,537

(22) Filed: Sep. 14, 2000

Related U.S. Application Data

(60) Provisional application No. 60/153,877, filed on Sep. 14, 1999.

(51) Int. Cl.[7] ........................ G10L 11/02; G10L 21/06; G10L 15/04; G10L 13/08; G06F 17/21

(52) U.S. Cl. .................... 704/270; 704/270.1; 704/272; 704/251; 704/258; 704/9; 704/10

(58) Field of Search .............................. 704/270, 270.1, 704/272, 251, 258, 9, 10; 434/156, 319; 446/175, 297–301, 395; 340/539

(56) References Cited

U.S. PATENT DOCUMENTS 1,322,954 A 11/1919 Rosenfeld
3,343,840 A 9/1967 Winters
4,221,927 A 9/1980 Dankman et al.
4,249,338 A 2/1981 Wexler
4,451,911 A 5/1984 Klose et al.
4,659,919 A 4/1987 Price
4,802,879 A 2/1989 Rissman et al.
4,840,602 A 6/1989 Rose
4,857,030 A * 8/1989 Rose .......................... 340/539
4,923,428 A 5/1990 Curran
5,029,214 A * 7/1991 Hollander ................... 704/272
5,083,968 A 1/1992 Hart
5,169,156 A 12/1992 Smollar
5,213,510 A * 5/1993 Freeman ..................... 434/319
5,261,089 A * 11/1993 Coleman et al. ............... 707/8

(List continued on next page.)

FOREIGN PATENT DOCUMENTS

CA 2225060 10/1998
JP 09-131468 * 5/1997 ............. G10L/3/00

(List continued on next page.)

*Primary Examiner*—Doris H. To
*Assistant Examiner*—Daniel A. Nolan
(74) *Attorney, Agent, or Firm*—Piper Rudnick

(57) ABSTRACT

Talking toys perform simulated conversations with one another. The toys each include a forest of decision graphs. The forest of decision graphs is the same for each toy. Each of the decision graphs corresponds to a conversation and includes a number of nodes, each of which corresponds to a portion of the conversation. The nodes also include one or more contexts which connect the nodes to children nodes. As a result, the selection of the context directs the progression of conversation. The toys select a decision graph/conversation that includes all or most of the toys as participants. The conversation is then performed as the toys traverse the selected decision graph. The toys transfer messages back and forth via a wireless transmission and reception arrangement as they traverse the decision graph. The toys play the portions of the conversation through a speaker. Each of the toys includes an architecture including a physical layer, which includes the transmission and reception circuitry, and an application layer that contains the forest of decision graphs as well as a participant list and identification information for a conversation manager. The conversation manager toy broadcasts updates to the participant list and the current conversation node. The architecture also includes a messenger layer that verifies and passes messages between the application the physical layers.

49 Claims, 20 Drawing Sheets

U.S. PATENT DOCUMENTS

| | | | | | |
|---|---|---|---|---|---|
| 5,281,143 | A | | 1/1994 | Arad et al. | |
| 5,324,225 | A | | 6/1994 | Satoh et al. | |
| 5,607,336 | A | | 3/1997 | Lebensfeld et al. | |
| 5,633,985 | A | | 5/1997 | Severson et al. | |
| 5,648,753 | A | | 7/1997 | Martin | |
| 5,774,628 | A | | 6/1998 | Hemphill | |
| 5,802,488 | A | | 9/1998 | Edatsune | |
| 5,899,972 | A | * | 5/1999 | Miyazawa et al. | 704/251 |
| 5,944,533 | A | | 8/1999 | Wood | |
| 6,035,269 | A | * | 3/2000 | Kim | 704/9 |
| 6,089,942 | A | * | 7/2000 | Chan | 446/175 |
| 6,110,000 | A | * | 8/2000 | Ting | 446/175 |
| 6,227,931 | B1 | * | 5/2001 | Shackelford | 434/156 |
| 6,309,275 | B1 | * | 10/2001 | Fong et al. | 446/175 |

FOREIGN PATENT DOCUMENTS

| | | | | |
|---|---|---|---|---|
| JP | 09-281985 | * | 10/1997 | G10K/15/04 |
| JP | 11-207031 | * | 8/1999 | H04B/7/24 |
| JP | 2000-218059 | * | 8/2000 | G10L/13/00 |
| WO | WO 99/17854 | | 4/1999 | |

* cited by examiner

SMART TOYS

CLAIM OF PRIORITY

This application claims priority from U.S. Provisional Patent Application Ser. No. 60/153,877, filed Sep. 14, 1999.

BACKGROUND

The present invention generally relates to toys, and, more particularly, to a toys that may interact with one another so as to provide the appearance of carrying on a conversation.

In today's world of toys, interaction is vastly limited to simple movements and sentences are often repetitive, fixed and involve very little (if any) interaction with other toys. Conventional toys that incorporate speech function in one of the following manners: sound recognition, light recognition, infrared identification, and strict playback. These options allow for 'linear patterned' speech which follows a specific script that is activated by a stimulus (i.e. drawstring, push-button, switch, etc.) This patterned speech is both repetitive and quickly tiresome for inventive and imaginary children who are fascinated by interactivity and peculiarity.

A demand therefore exists for technology that makes it possible for toys to interact with each other in witty, smart, interesting and conversationally diverse ways. Such toys would not be bound by a few short sentences, a lack of context or the same monotonic dialogue.

It is an object of the present invention to provide a toy that largely eliminates the disadvantages relative to conventional speech-related toys and electronic games by providing a toy fully capable of intelligent asynchronous speech with other toys.

It is a further object of the present invention to provide a toy that is uninhibited with restrictions such as wires, platforms, power supplies, etc. and fully durable to withstand the daily duress inflicted by even the most adventurous of children.

These and other objects of the invention will be apparent from the remaining portion of the specification.

SUMMARY

The present invention is directed to toys that may interact so as to present the appearance of the toys conversing. The toys feature an architecture including a physical layer, a messenger layer and an application layer. The physical layer communicates with the application layer through the messenger layer. The physical layer receives and transmits messages from and to compatible toys through a physical medium. The physical layer may be an infrared transceiver, radio transceiver or any other type of wireless communications. The messenger layer receives and verifies messages from the physical layer and passes verified messages to the application layer. The messenger layer also receives messages from the application layer and passes the messages from the application layer to the physical layer for transmission. The application and messenger layers may be implemented on micro-controllers or an application-specific integrated chip.

The application layer features a forest of decision graphs, where each of the decision graphs corresponds to a conversation. Each of the decision graphs includes a number of nodes with at least some of the nodes corresponding to a passage of the conversation of the decision graph. Each of the nodes includes one or more contexts with each of the contexts corresponding to an edge leading to one or more child nodes. As a result, the selection of the context directs progression of the conversation between the toys. The application layer also includes a participants list that lists the toys participating in the conversation and a conversation manager. The participants list is utilized in selecting the conversation/decision graph and may be utilized in selecting the context. The conversation manager broadcasts updates regarding the participants list and the identification number of the node of the current conversation/decision graph.

The messenger layer includes a receiver component and a transmitter component. When a message is received by the receiver component, the transmitter component passes a message acknowledgement (MSG_ACK) containing a copy of at least a portion of the message to the physical layer for transmission to an originating toy that sent the message. The messenger layer passes the message to the application layer upon receipt of an acknowledgement acknowledgement (ACK_ACK) from the originating toy in response to the transmission of the message acknowledgement (MSG_ACK) indicating that the originating toy has verified proper receipt of the message by the receiving toy.

For a more complete understanding of the nature and scope of the invention, reference may now be had to the following detailed description of embodiments thereof taken in conjunction with the appended claims and accompanying drawings.

DESCRIPTION

The present invention is directed to a toy that may interact with other toys so as to present the appearance of the toys conversing. The interaction is provided by a toy that incorporates several cutting-edge technologies such as artificial intelligence, advanced communication protocols and hardware, the latest in speech storage, micro-controller technologies and a host of others to achieve multi-modal collaborative agent communication. This is achieved in both intra-series (within one particular toy product line) and inter-series (spans across a number of toy product lines) asynchronous communal speech. The toy may perform asynchronous speech with other toys within it's own toy line or series. This exists in either 1:1 character conversation or n:n characters (including duplicate characters) in a single line or series of toys (i.e. toys from a childrens' movie sitting around a fire telling ghost stories). An alternative modality provides for the collaborative speech of toys of completely separate series (i.e. toys from a childrens' movie are approached by a fashion doll that was not a character in the movie and act particularly shy and nervous, their conversation reflecting their discomfort). The underlying theme of the conversation can range anywhere from dialogues from a movie to strategic planning conversations (two groups of toys planning a war between themselves) or collaborative conversations (like a group of dolls planning a tea-party).

In the first subsection of the Description, a high-level overview of the functionality of the toy of the present invention is presented. In the second subsection, the detailed functionality of the architecture of the toy of the present invention is presented.

High-Level Functional Overview

The toy of the present invention is capable of performing high-level functions such as robust, dynamic, and efficient distributed management of n-way interactions between toys, space and memory efficient storage and generation of thousands of unique conversations, intra-series communication and inter-series communication.

Simple Two-Way Toy Handshaking and Interaction

The first (and simplest) interaction scenario is between two toys. Generalized n-way interaction is an extension of the two-way scenario and is described in a subsequent section.

Figure 1:
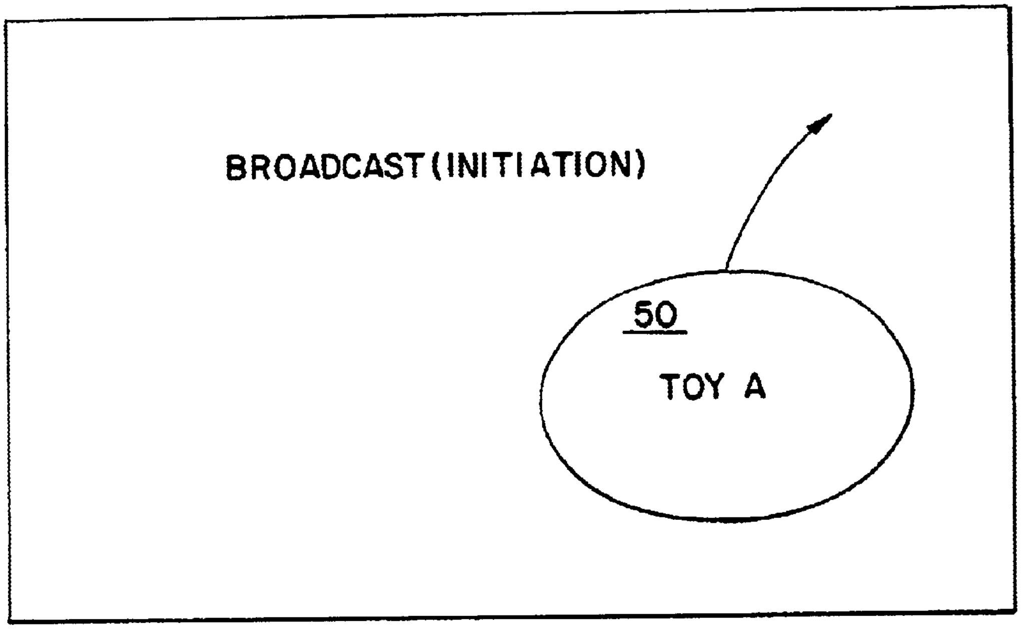
FIG. 1 is a diagram illustrating an initiation broadcast by toy A, which is an embodiment of the toy of the present invention, in a 2-toy handshaking scenario.

Initially a single toy is turned on and begins to broadcast an INITIATION message to notify any nearby toys of its awakening. The message is not directed toward any particular toy. FIG. 1 shows a single toy 50, Toy A, broadcasting the INITIATION message. The broadcast is repeated over a period of time until an acknowledgment is received from another toy or Toy A is turned off.

Figure 2:
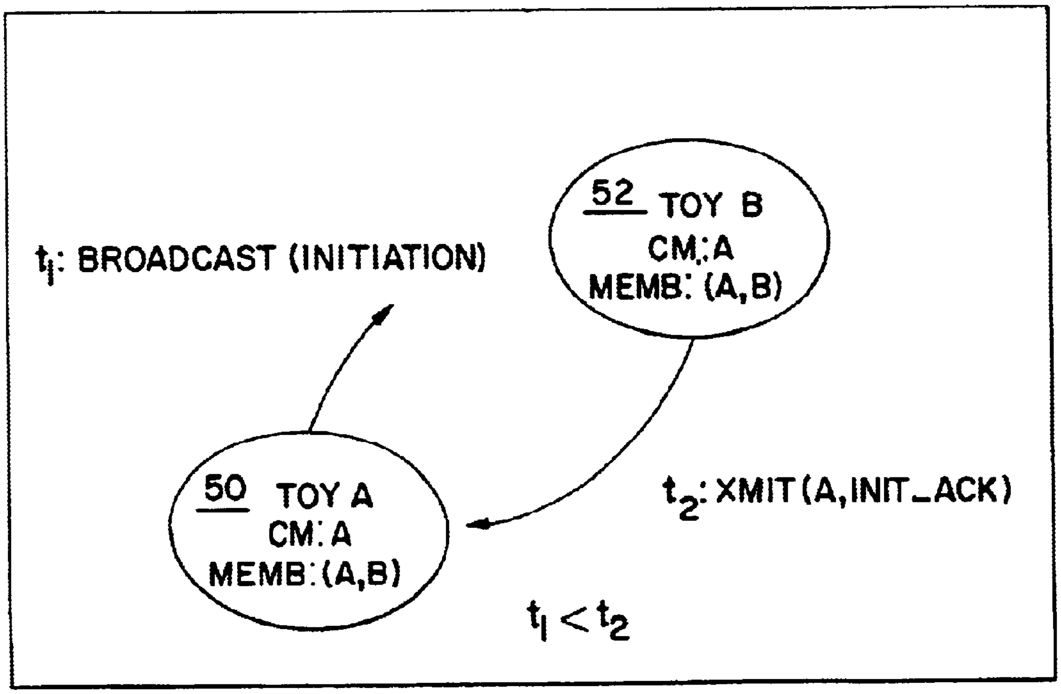
FIG. 2 is a diagram illustrating a toy B performing an initiation acknowledgment of the initiation broadcast by toy A of FIG. 1.

When another toy receives the INITIATION message, it responds with an INIT_ACK message directed at the sender of the INITIATION message. In FIG. 2, Toy B (52) receives the INITIATION message from Toy A at time t1 and responds with an INIT_ACK message at time t2(t1<t2).

After Toy A has received the INIT_ACK message, both Toy A and Toy B have updated the conversation manager (CM) for the current conversation episode as well as the current actors for the conversation (Toy A and Toy B). Every conversation episode has a conversation manager which is in charge of selecting the conversation, managing interactions between toys in the normal flow of conversation, and handling various error conditions. Actors are toys which participate in the current conversation episode. There are many ways of selecting the conversation manager given a set of participants in a conversation episode, as well as algorithms for selecting a conversation probabilistically given a set of possible conversations and the set of actors. Examples are provided in a later section.

Figure 3:
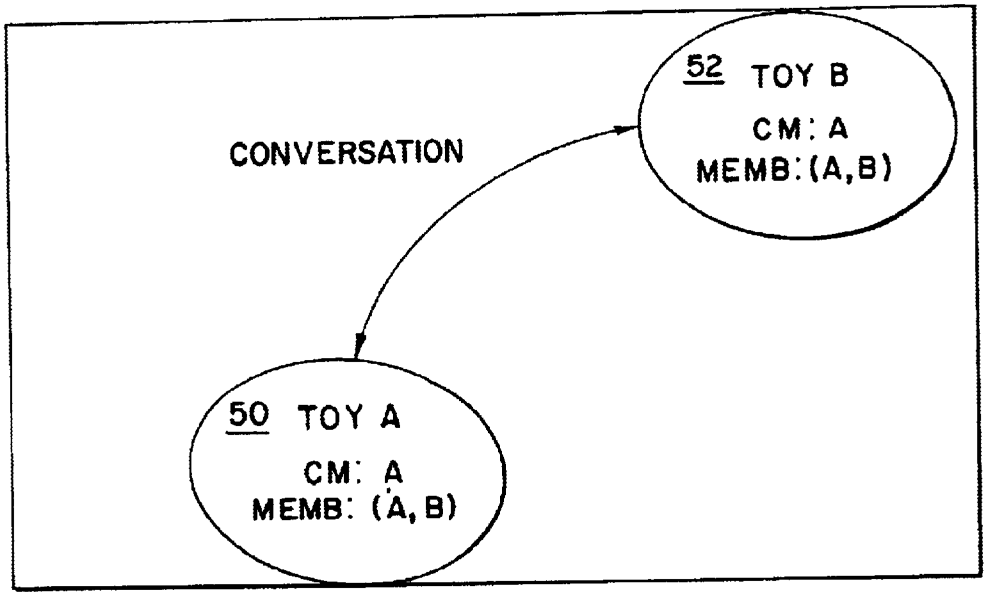
FIG. 3 is a diagram illustrating a sustained conversation between the toys of FIG. 2.

After the conversation manager selects the conversation based on its understanding of the actors for the conversation episode, a sustained conversation takes place, as illustrated in FIG. 3. The conversation consists of a sequence of actors performing prescribed actions (which may be speech, articulation, or even movement) which is supported by an underlying backbone of wireless communications to order the sequence of actions.

Three-Way and N-Way Toy Interaction

Figure 4:
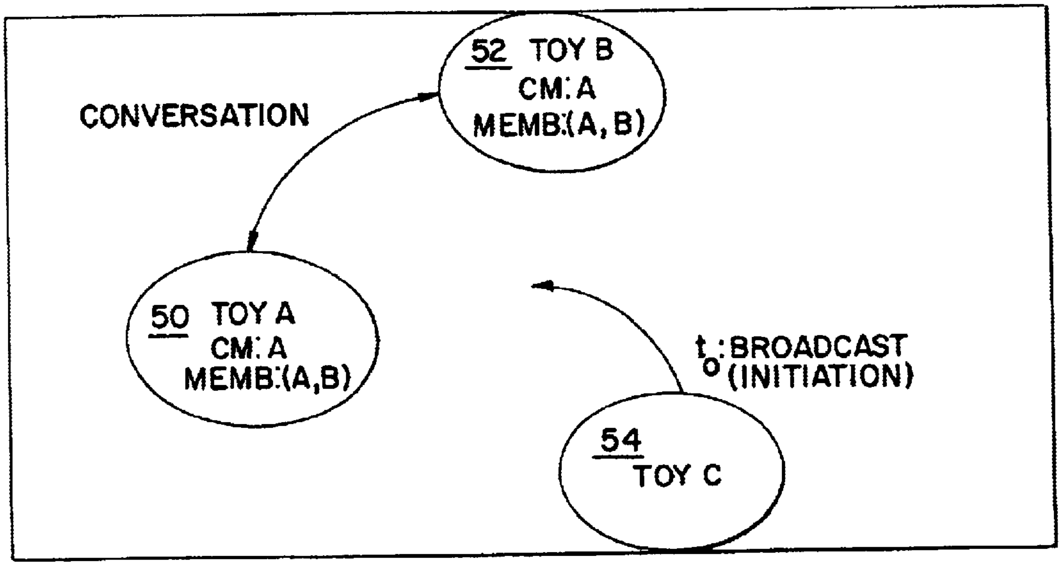
FIG. 4 is a diagram illustrating an initiation of a 3-way interaction between the toys of FIG. 2 and an additional toy C.

The two-way interaction scenario may be extended to handle three-way and n-way toy interaction. A scenario wherein Toys A and B are engaging in a two-way conversation, and Toy C (54) enters into the vicinity and broadcasts an INITATION message is illustrated in FIG. 4.

Figure 5:
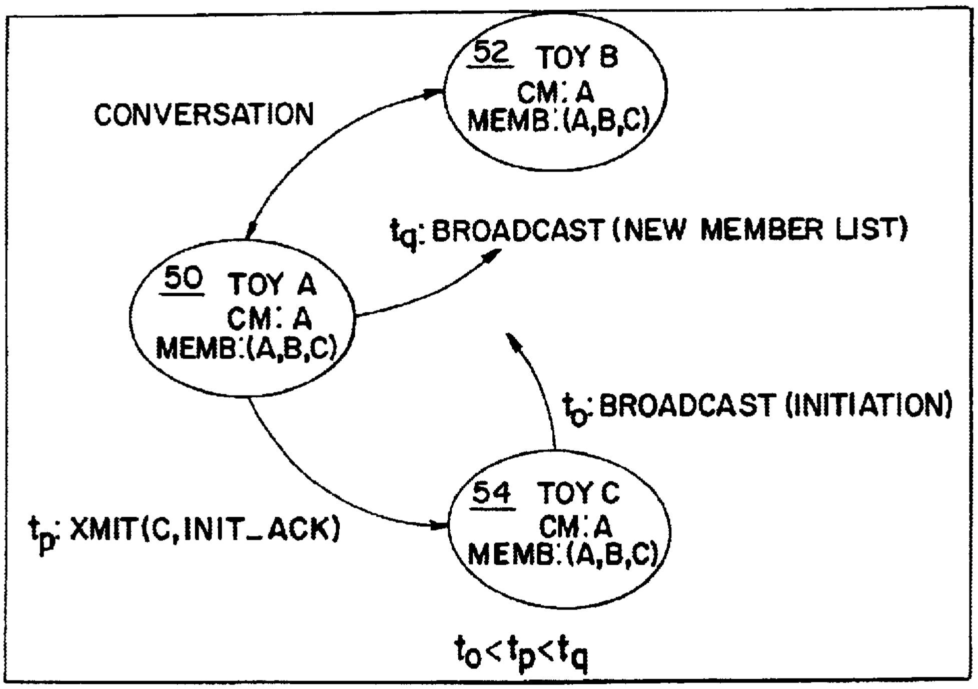
FIG. 5 is a diagram illustrating initiation acknowledgment in the 3-toy interaction scenario of FIG. 4.

At this point, Toys A and B could ignore Toy C or seamlessly incorporate Toy C into the conversation. As the first option is trivial to implement, the second option is described here. When Toy A receives the INITIATION message from Toy C it responds (without breaking the flow of conversation with Toy B) to Toy C with an INIT_ACK message (FIG. 5).

Figure 6:
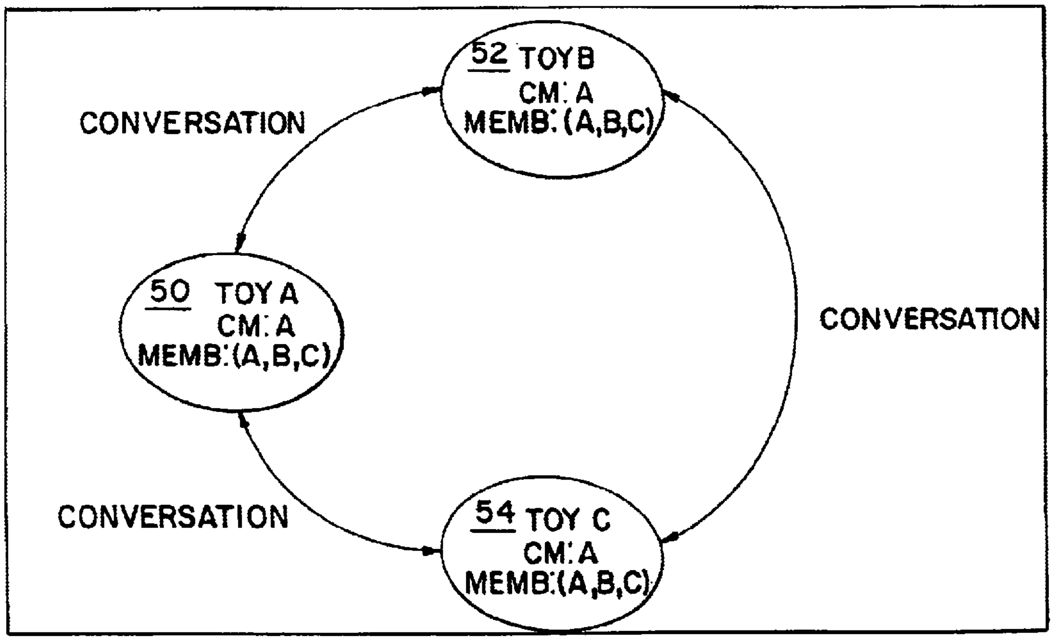
FIG. 6 is a diagram illustrating sustained 3-way conversation between the 3-toys of FIG. 4.

Assuming that the INITIATION message was broadcast at time $t_O$, Toy A first sends an INIT_ACK message to Toy C at time $t_p(t_O<t_p)$. The INIT_ACK message contains the context of the current conversation (e.g. the conversation manager identity, the actors in the conversation, and information about the current conversation). This updates Toy C's internal representation. The conversation manager (Toy A) then broadcasts a new member notification containing Toy C to all of the current actors in the conversation at time $t_a(t_p<t_a)$. As illustrated in FIG. 6, once the other actors (e.g. Toy B) receive the update message, all of the internal representations of the actors are synchronized. Toy C is now a full member of the conversation and can participate when directed.

It should be noted that this process can be extended to the n-way case robustly. Reliability depends on the amount of bandwidth supported by the wireless communication technology.

Removing a Toy

Figure 7:
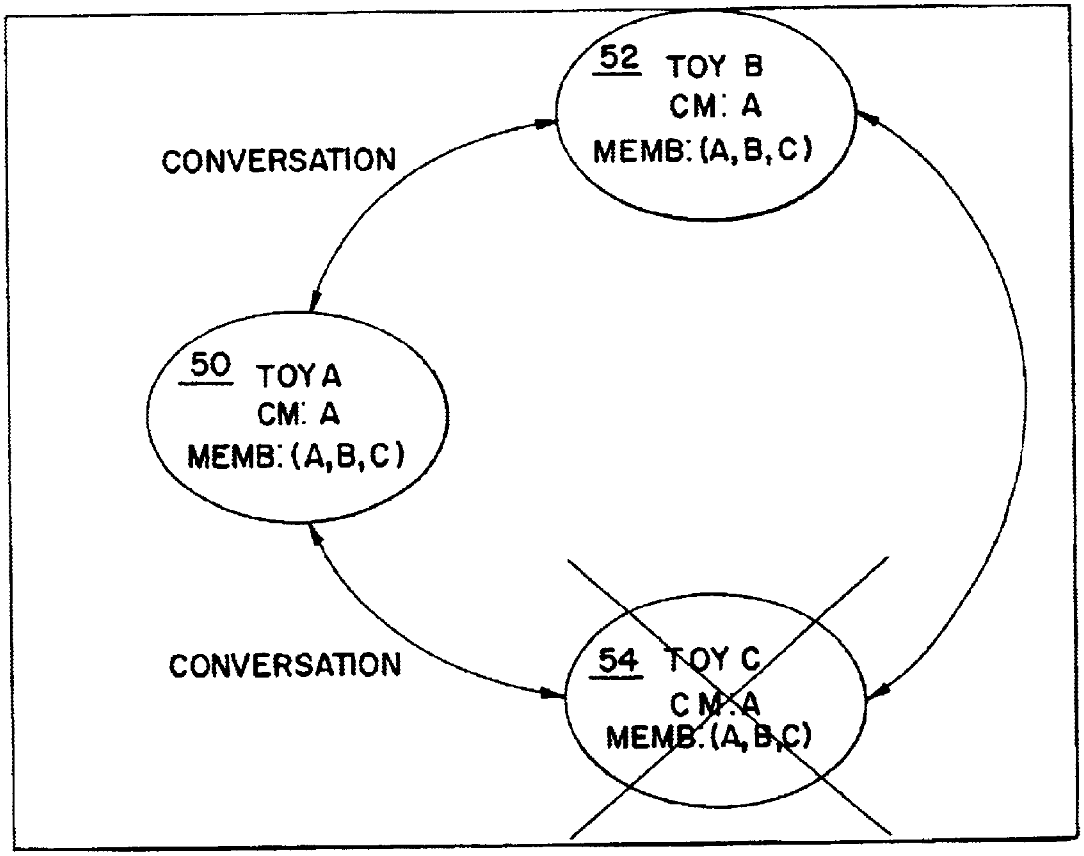
FIG. 7 is a diagram illustrating the removal of a toy from the conversation of FIG. 6.

Another common scenario during a conversation is when a toy drops out of the conversation. This may be due to many reasons. For example, the toy may have moved out of range of the other toys, the child (or owner) may decide to remove it from the current conversation or it may run low on battery power. This scenario is shown in FIG. 7, where Toy C drops out of the conversation.

It should be noted that the absence of Toy C does not impact the conversation until it is selected to perform the next action in the conversation. This process can be extended to the n-way case robustly. Reliability depends on the amount of bandwidth supported by the wireless communication technology.

Handshaking (Three or More Toys)

As is apparent from the above, even when toys are involved in a conversation they are listening for new communications from other toys that want to "join-in" into the current conversation. This process can be used to involve an n-toy handshaking protocol.

If there are at least three toys at the start of a conversation, then the toys will follow their toy-number, or Global Identification Number (GIN), to determine which two toys have priority. The two toys with priority initiate the handshaking procedure as described above. At this point all that the third toy is doing is sending an INITIATION message. The INITIATION message is received by one of the first two toys that have already finished the handshaking stage and are now in the communication stage. The toy receiving the INITIATION message will send an INIT-ACK message as illustrated in FIG. 6. The processing will then proceed as described above with regard to FIG. 5.

Architecture Description

This subsection describes a general underlying architecture to implement the functionality described in the previous subsection.

Figure 8:
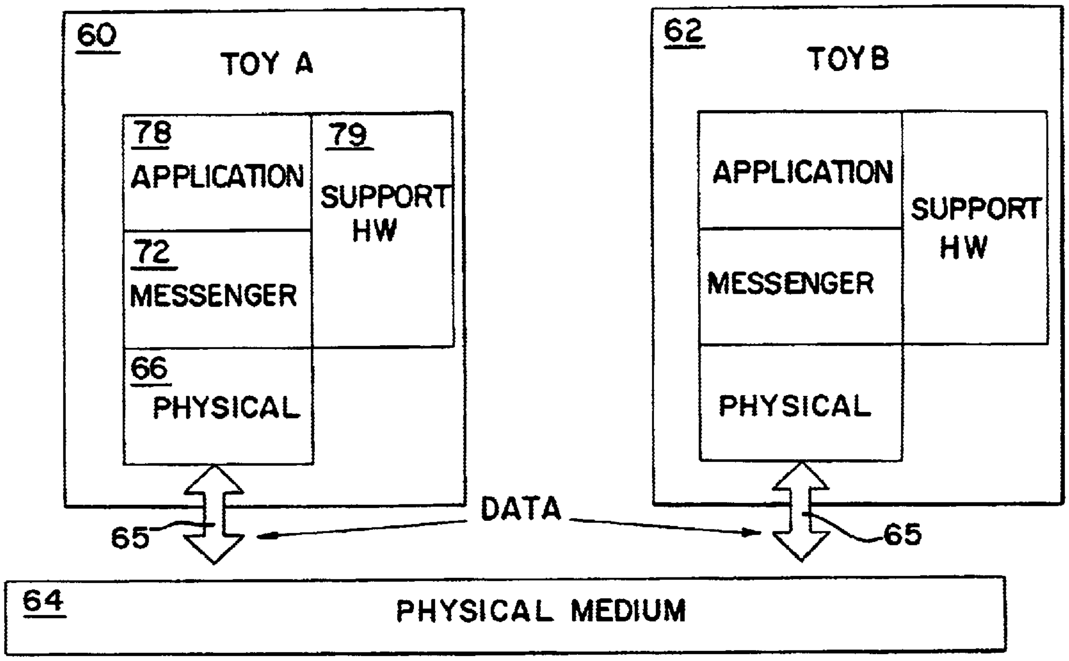
FIG. 8 is a block diagram of the generalized layered architecture for an embodiment of the toy of the present invention.

FIG. 8 shows the layered architecture for two toys or units 60 and 62. It should be noted that every toy/unit has an identical architectural structure. The Physical Medium 64 consists of the technology which allows for the transmission of data 65 between different toys. This medium may be infrared (IR), radio waves (RF) or other forms of wireless communication.

Figure 9:
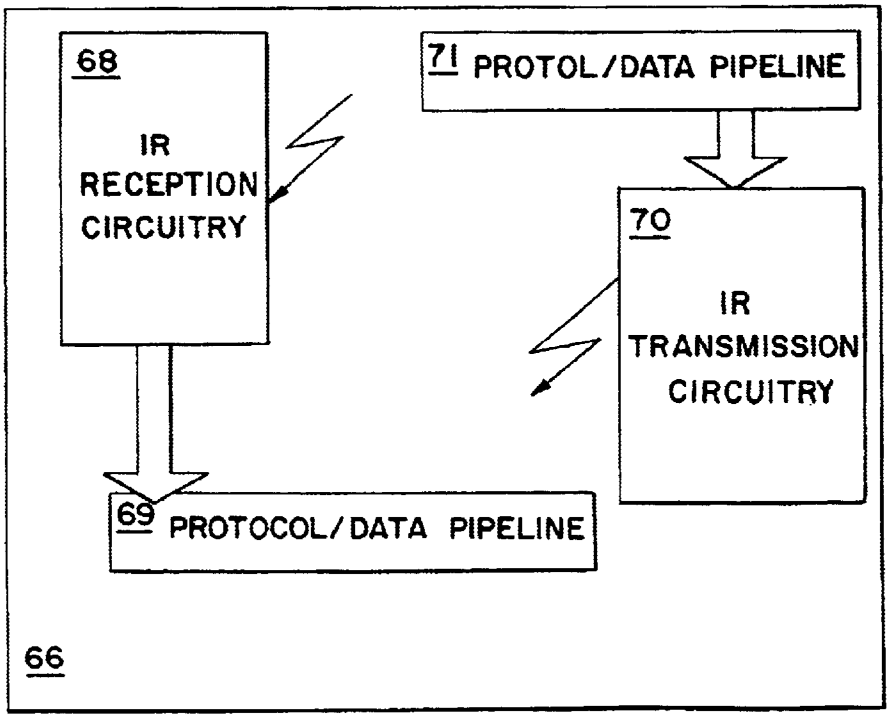
FIG. 9 is a diagram of the infrared transmission and reception components of an embodiment of the toy of the present invention.

Fundamental to the notion of interaction between non-physically connected units is a wireless transmission capability which allows the transfer of well-structured chunks of information from a sender to a set of receiver(s). The Physical layer, indicated at 66 in FIGS. 8 and 9, consists of the hardware (HW) and embedded software (SW) which allows each toy to access and effect the Physical Medium. In an embodiment of the toy of the present invention illustrated in FIG. 9, a receiver 68 feeds data into a protocol/data pipeline 69 and a transmitter 70 which sends data from a protocol/data pipeline 71. The protocol/data pipelines 69 and 71 communicate with the Messenger layer 72 of FIG. 8. The information that is transmitted and received by the IR transmission and reception circuitry is a protocol in binary sequence. That is, a series of well structured chunks of information in the form of 1s and 0s (binary) in sequential order. The IR reception and transmission circuitry may be incorporated into a single device such as a standard 60 kHz IR transceiver.

Figure 10:
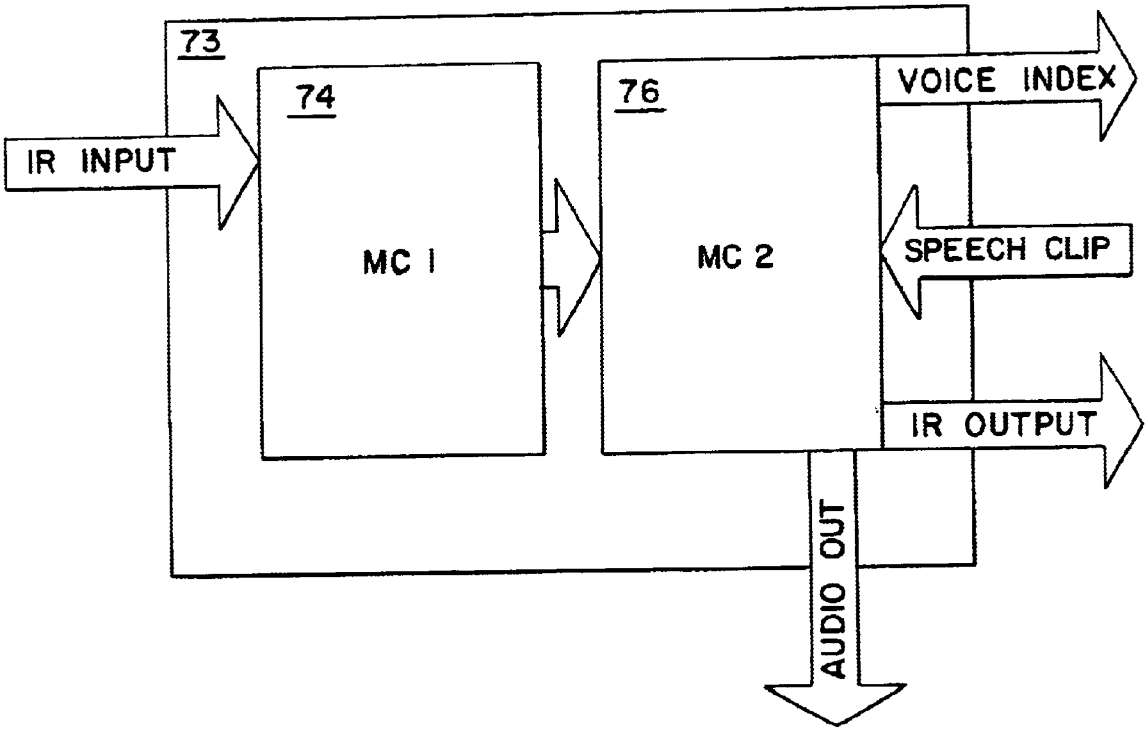
FIG. 10 is a block diagram of the micro-controller architecture in an embodiment of the toy of the present invention.

After a toy receives a message, a two-stage process occurs. First is the processing which involves the verification and extraction of information from the message received. Second is the analysis of this information to determine what is the next thing that the toy must do. The processing and analysis are performed by the Messenger and Applications layers of the invention architecture, respectively, which are implemented on a controller, an embodiment of which is illustrated at 73 in FIG. 10. Controller 73 may be an integrated circuit chip or any other electronic device. FIG. 10 illustrates a controller with a duo micro-controller arrangement, featuring a first micro-controller 1, indicated at 74, and a second micro-controller 2, indicated at 76. Micro-controllers 74 and 76 are utilized to implement the Messenger and Application layers, 72 and 78 in FIG. 8, respectively.

Figure 11:
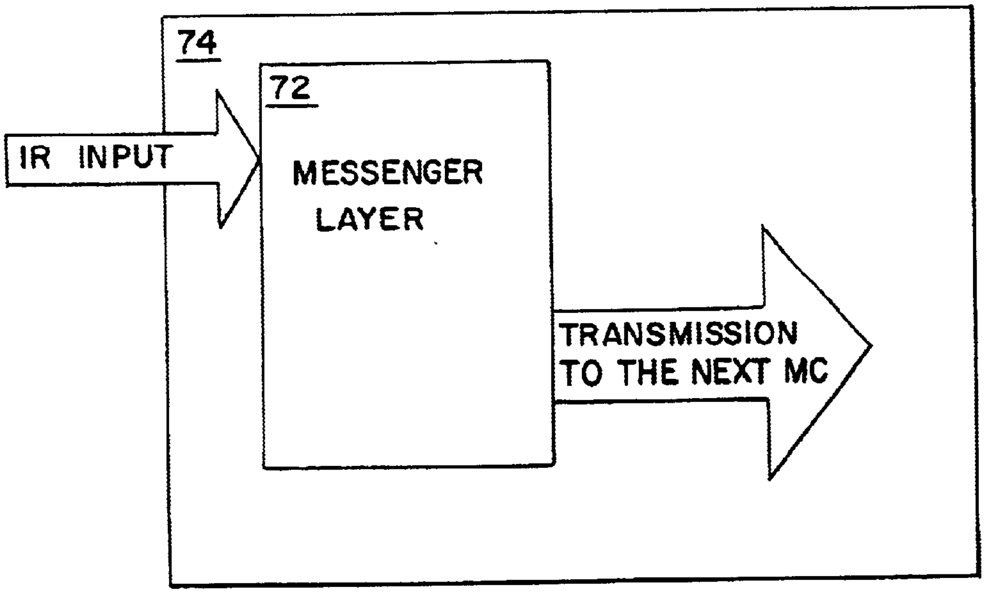
FIG. 11 is a block diagram of the first micro-controller of the toy of FIG. 10.

With reference to FIG. 11, once a transmission has been received successfully by a toy, it is processed so that it is verified and the relevant fields that contain information needed in the analysis stage are extracted. This is handled by the first micro-controller 74. When a transmission is received, the "Receiver" field is processed. If the message is not addressed to the receiving toy, the message is not addressed to everyone (a broadcast message) or it is not a special transmission, then the transmission will be discarded. If the message is addressed to the receiving toy, is a general transmission or is a special broadcast, then the message is further verified and is considered for the analysis stage. Upon completion of the further verification (described in greater detail with regard to the Messenger layer below), the appropriate fields (Sender, Receiver, Message ID, etc.) are extracted and by the Messenger layer and the composed stream is passed to the second micro-controller (76 in FIGS. 10 and 12).

In addition to verifying and extracting information from received messages, the Messenger layer 72 (FIG. 8) performs the low-level actions of sending and confirming complete messages (generated by the Application layer 78) to other toys accessible through the Physical Medium. The Messenger layer manages message requests from the Application layer and controls/monitors the data transmitted/received by the Physical layer. The Messenger layer performs flow control, error-handling, and supports both point-to-point (i.e. toy to toy) as well as broadcast style communications. The Messenger layer may also interact directly with any specialized supporting hardware.

The Application layer 78 (FIGS. 8 and 12) handles all high-level control of the system. It manages the toy's interaction with other toys and enables all of the unique functionalities. In particular, the Application layer is able to negotiate and sustain multi-way interactions/conversations with other toys accessible through the Physical Medium. The Application layer for a particular toy communicates with the Application layer for other toys. Message requests are sent by the Application layer to the Messenger layer. The Application layer may also handle interactions with support hardware such as EEPROMs/memory units and voice synthesis technologies.

Figure 12:
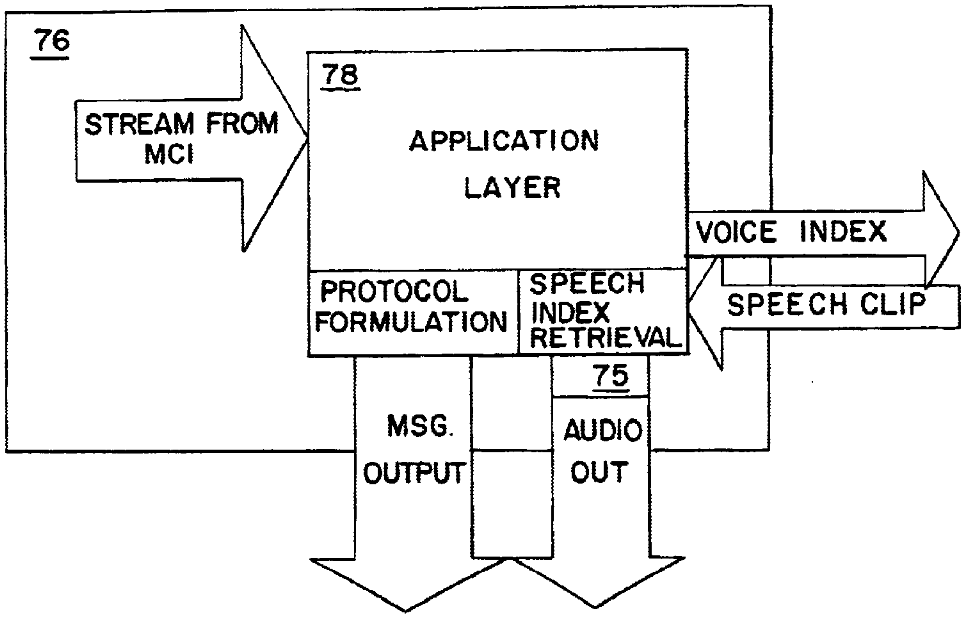
FIG. 12 is a block diagram of the second micro-controller of the toy of FIG. 10.

As illustrated in FIG. 12, the information verified and extracted from the raw message in the Messenger layer is sent to the second micro-controller 76 for analysis by the Application layer 78 and whatever appropriate action needs to be taken. In the analysis phase, illustrated in FIG. 12, a conversation is selected from the Application layer Decision Graph forest (discussed later) to choose how the conversation is going to progress.

Once the conversation has been selected, retrieval of the indexed sentence occurs. The dialog for the toy is stored on some secondary storage medium. For example, the sentences may be stored on-a voice storage chip. Once retrieved, the sentence is audibly played through speaker 75. Any storage medium can be used as long as the retrieval time is factored into the response-time for the toy and is under an acceptable limit.

The last stage of this process involves the compilation of a new message in the format of the protocol using information retrieved from the conversation data and the toy's internal identification number/Global Identification Number (GIN). This new message is sent to the Messenger layer which routes the message for transmission.

As illustrated in FIG. 8, the architecture allows for Support HW 79 to be controlled by both the Application layer as well as the Messenger layer. As an example, Support HW may consist of, but is not limited to, EEPROMs/memory, voice synthesis technologies, electro-mechanical control and actuation units. With regard to the latter, simple animation of the mouth based on the spoken voice can be achieved by using electromagnetic attractors on the lower side of the jaw of the toy. The greater the intensity of the sound, the more the mouth is forced to open. Pseudo-realistic movement can be achieved by using a simple cutoff mechanism for smaller fluctuations of the voice. Technology for smoothening (such as a Fourier transform) can be used.

There are many potential embodiments of HW for implementing the architecture of the toy of the present invention including, but not limited to, the following two embodiments:

Micro-controller Embodiment

A natural way to implement the architecture is through the use of micro-controllers. An example of this embodiment has been presented and described above with regard to FIGS. 10–12.

Micro-controllers are essentially small processors, with limited processing power and memory, which are used to control devices. The advantage of using micro-controllers is that they are easily (re)programmable. Depending on the power of the selected micro-controller, one or many micro-controllers may be used, along with the necessary support hardware.

Application-Specific Integrated Circuit Chip ("ASIC") Embodiment

The "ASIC" embodiment covers any attempt to implement controller 73 (FIG. 10) or the above architecture directly as a chip or chipset. These implementations are more difficult but usually yield a lower-per-unit cost as well as potentially higher performance characteristics. Typical "ASIC" embodiments may be built from scratch or use some programmable architecture (i.e. field-programmable gate arrays, LASICs, etc.).

The Messenger and Application layers will now be described in greater detail.

Messenger Layer

Functionality Overview

The Messenger layer represents the unit of functionality which allows the different units to transmit and receive messages reliably. The Messenger layer implements the nuts and bolts of receiving messages asynchronously from an outside source (which it passes to the Application layer), and transmitting messages given to it by the Application layer. The Messenger layer must perform the handshaking necessary to verify that the message it receives/transmits is correct and complete, and must be scalable sufficiently to operate reliably and efficiently in an environment with multiple units.

Data Structures and Formats

The Messenger layer implements one key data format: the Message. The Message represents the basic unit of communication between toys across the Physical Medium. A Message imposes a methodology of interpreting the series of bits that compose the Message (which may be fixed or standard length). The Message format is a series of "strings" of bits; each string or set of strings has a well-defined meaning. The key "strings"/sets of "strings" which form a message are: 1) Message Begin/Message End; 2) Sender; 3) Receiver; 4) Message ID; 5) Message Type; 6) State Data; 7) Message Content.

Message Begin/Message End represent strings which define the beginning or end of a Message. These strings are used by toys to determine when data read by the Physical layer is meaningful or not.

The Sender string identifies the sender of the Message.

The Receiver string identifies the intended receiver of the Message. In some cases this field is blank (i.e. for broadcasts to the set of toys accessible through the Physical Medium).

Message ID is an optional string which is a unique identifier for a Message.

Message Type is an optional string which allows the receiver additional early interpretation capabilities.

State Data is an optional string which allows the transmitter to send state data about its internal representation to other units very efficiently. This string will have its own implementation-specific sub-string semantics.

Message Content is a fixed or variable-length string which encodes the body of the Message.

A potential embodiment of the above is to designate the following representation for Messages transmitted by the Messenger layer, with each Message being no longer than MAXLENGTH (e.g. 300) bits total:

[Message Begin] [Sender] [Receiver] [Message ID] [Message Type] [Context (State Data)] [Message Content] [Message End]

Message Begin

A unique series of 16 bits which indicates the start and end of a message. A sample: 1111111101010101

Sender

A unique identifier for the unit transmitting the message (8 bits). Starts from 1.

Receiver

A unique identifier for the unit receiving the message (8 bits). Starts from 1. Broadcast messages will have this field set to 0.

Message ID

A unique identifier for the transmitted message (8 bits)

Message Type

One of: MSG, MSG_ACK, ACK_ACK (4 bits)

One of: MSG, MSG_ACK, ACK_ACK (4 bits)

| Message Type | Meaning |
|---|---|
| MSG | An original message from the transmitter to the receiver |
| MSG_ACK | An acknowledgement of the original message from the Receiver to the transmitter |
| ACK_ACK | An acknowledgement of the message acknowledgement |

Context

A specific implementation of the State Data field, Context is a representation of a conversational context (which may be emotion, conversation tracks, topics, etc.).

Message Content

Variable-length field which contains the contents of the message. Its interpretation varies according to the Message Type. Some examples are:

| Message Type | Contents |
|---|---|
| MSG | Meaning of contents to be decoded by Appl. Module |
| MSG_ACK | The previous message's contents |
| ACK_ACK | The msg_id of the MSG_ACK |

Message End

A series of 16 bits which indicates the end of a message. A sample:

1010101111111111

Interface with Physical Layer

The Messenger layer must interact with the Physical layer to transmit its Messages to the Physical Medium. This interface is technology-dependent and may be simple or complex, depending on the technology used to implement the Physical layer. A stream of bits may be required, or more sophisticated Physical layers may be able to access an entire unit of information (e.g. a Message) all at once.

A potential embodiment of this is an interface with an infrared (IR) transceiver unit. In this case, a common clock drives both the IR unit as well as the Messenger layer's interface component. The IR unit is able to transmit/receive one bit per clock cycle. The Messenger layer transforms a Message into a stream of bits which is sent to the IR transceiver. For reception, during each clock cycle a bit of data is recorded from the IR transceiver and stored in a data buffer within the Messenger layer. This data buffer is constantly scanned for Message Begin bit strings. When a Message Begin is discovered, all of the bits between it and a Message End bit string are saved in the buffer and interpreted as a Message. If the Message End is not received within MAXLENGTH bits then the MAXLENGTH bits within the buffer are interpreted as a Message. Numerous other error handling techniques are possible.

Interface with Application Layer

The Messenger layer must interact with the Application layer. On the basis of its internal state, the Application layer may request that the Messenger layer send a Message to a particular toy or to all toys accessible through the Physical Medium. When it receives a Message transmission request, the Messenger layer may either make the Application layer wait until it has successfully sent the Message (blocking) or allow the Application layer to continue processing during the physical transmission of the Message (non-blocking). Advantages and disadvantages exist for blocking and non-blocking modes. Blocking mode is simpler to implement and does not require extra technology to ensure that the Messenger layer is not overburdened. Non-blocking mode allows for parallel processing (and enhanced performance) but is more complicated to implement.

Data Flow and Algorithms

All communications are modeled as single communication sessions between two units. A communication session between two units consists of: message transmission, error-checking, and potential retransmissions.

Figure 13:
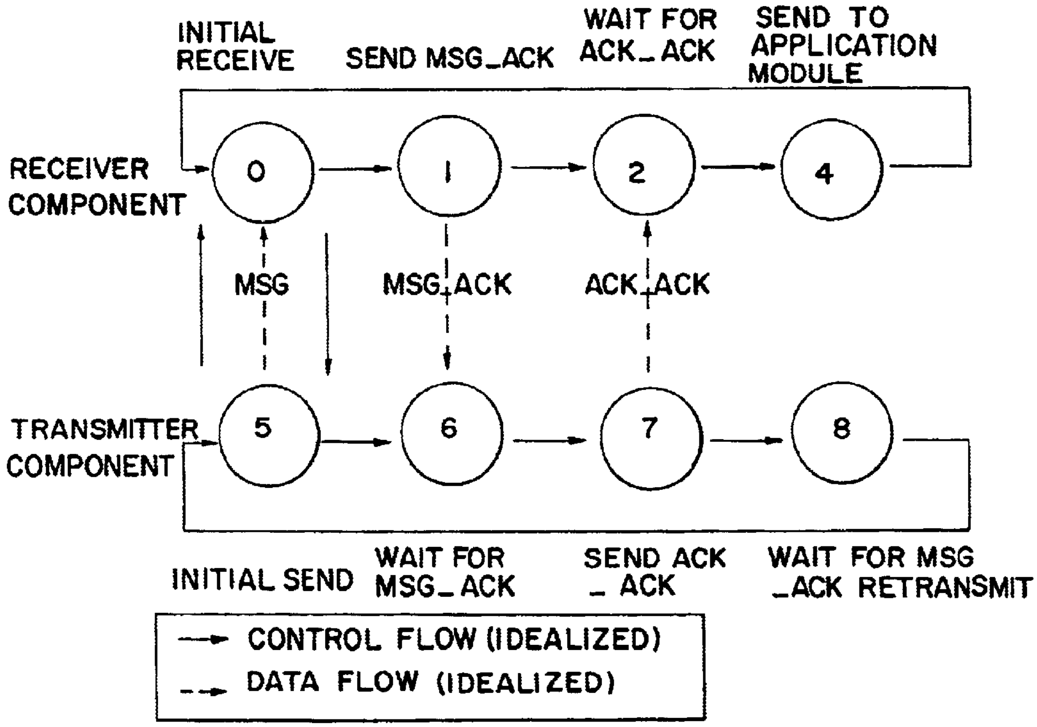
FIG. 13 is a diagram illustrating the high-level idealized data and control flows for the receiver and transmitter components of an embodiment of the toy of the present invention.

The idealized data flow is shown by the heavy dotted lines in FIG. 13. As will be explained below, the Messenger layer features a Receiver component and a Transmission component. In the following description and FIG. 13, the Transmitter is a component of the unit/toy sending the message and the Receiver is a component of the toy/unit receiving the message.

| Transmitter | Receiver |
|---|---|
| Get message from Application Module. Transmit message to Receiver (MSG) | |
| | Receive message from Transmitter. Send msg ack to Transmitter (MSG_ACK). |
| Receive msg ack from Receiver. Compare content of msg ack with the Original message it transmitted. If successful, send an ack of the msg ack to the Receiver (ACK_ACK) | |
| | Receive ack of the msg ack it sent out. Pass the original message to the Application Module. |

It should be noted that there are three message types sent out in this protocol: MSG, MSG_ACK, and ACK_ACK. MSG (sent from the transmitter to the receiver) is the original message sent out. MSG_ACK (sent from the receiver to the transmitter) is the receiver's acknowledgment of MSG. MSG_ACK also allows the transmitter to perform error checking on what message the receiver has received. ACK_ACK (sent from the transmitter to the receiver) is an acknowledgment that MSG_ACK checked out and that the receiver indeed has the correct message. After the receiver gets the ACK_ACK message from the transmitter the receiver (Messenger layer) knows that it has the complete, correct message, and it passes the message to the Application layer for further processing.

Of course, not all data flows will be successful all the way through as shown above. The Messenger layer also needs to accommodate noisy communications channels, disappearing units, etc. These issues will be discussed in a later section.

Control Flow/Finite State Machine Overview

Figure 14:
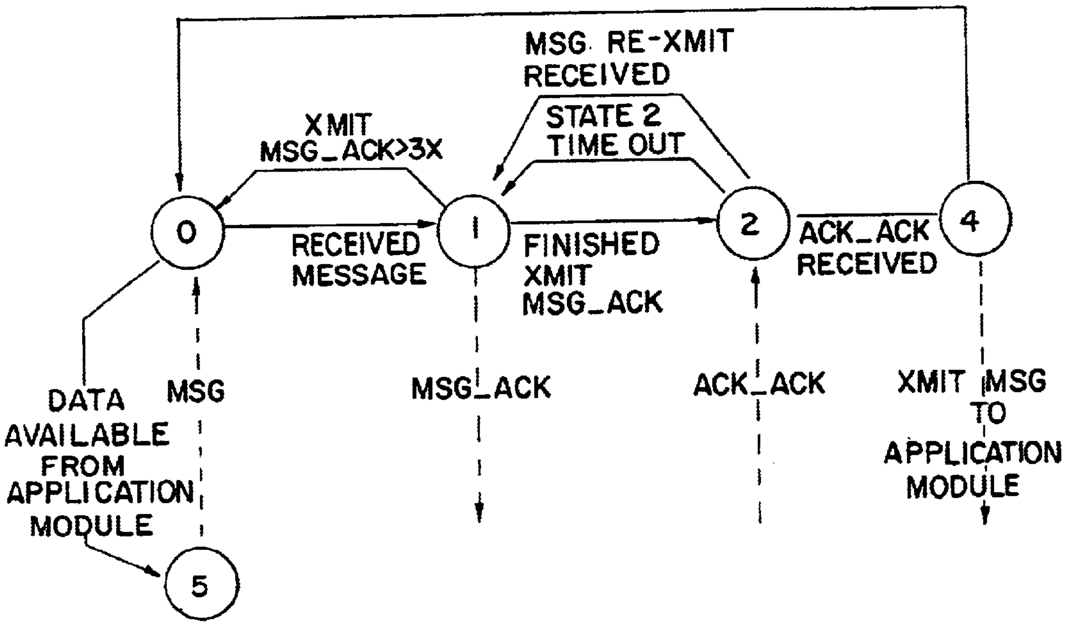
FIG. 14 is a diagram illustrating the flow of the receiver component of the toy of FIG. 13.
Figure 15:
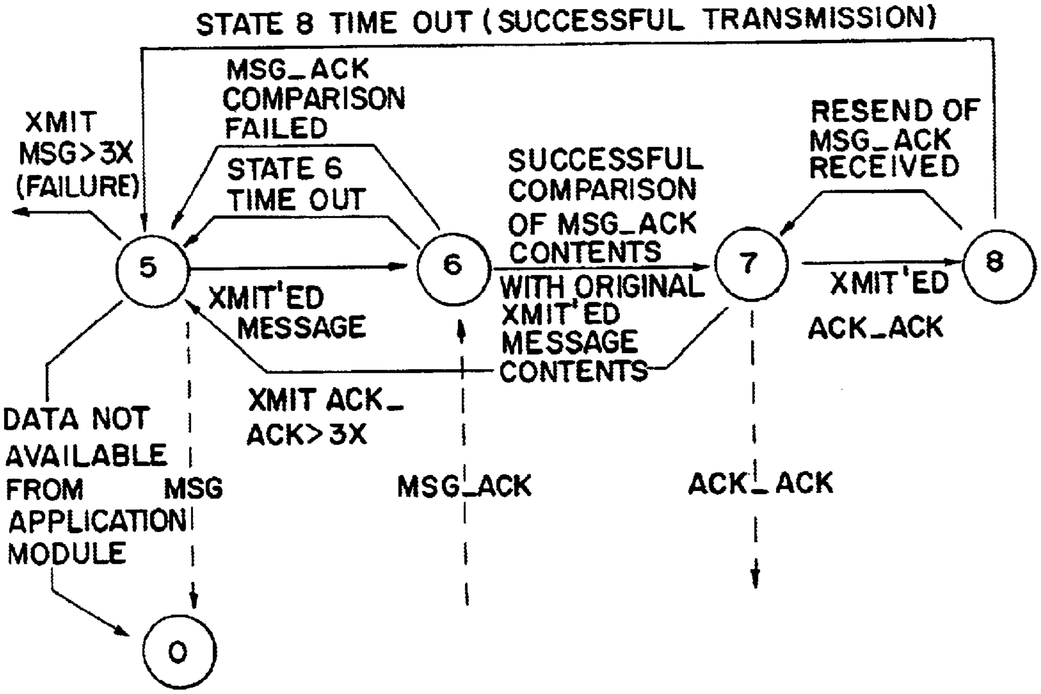
FIG. 15 is a diagram illustrating the flow of the transmitter component of the toy of FIG. 13.

The Messenger layer is implemented using a Finite-State Machine (FSM) with eight total states. The FSM is divided into two major components, a Receiver component (FIG. 14) and a Transmitter component (FIG. 15). In FIGS. 13–15, the Receiver and Transmitter states are indicated by the circles. It should be noted that transition between the Receiver component and the Transmitter component only occurs between the first two states of the components (i.e. State 0 of the Receiver and State 5 of the Transmitter). Once the Messenger layer proceeds along the Receiver or Transmitter path it stays there until it either succeeds or fails for the reception/transmission.

State Descriptions—Receiver Component (FIG. 14)

State 0 (Receive)

The main receive state of the Messenger layer/FSM. In this state, it watches only for messages with Message Type fields set to MSG and Receiver fields that are addressed to it or to "0". Saves the message for the duration of the communication session, including the message's msg_id (Message ID field).

Transition Rules:

Go to State 5 if the Application layer has data available and a message Begin field hasn't been received yet.

Go to State 1 if we have a complete message (i.e. we've seen the message footer).

State 1 (Send MSG_ACK)

Create and send a MSG_ACK message after receiving a MSG. Keep track of the msg_id of the MSG_ACK message sent out for future reference. Limit the total number of times the MSG_ACK has been sent out to 3(keep count using ack_msg_resend_count). Wait a random time before retransmissions (see Pragmatics section below).

Transition Rules:

Go to State 2 if ack_msg_resend_count is less than or equal to 3.

Go to State 0 (and reset ack_msg_resend_count) if ack_msg_resend_count is greater than 3. This is a transmission failure condition.

State 2 (Wait for ACK_ACK)

Wait for the ACK_ACK signal from the Transmitter (see State 6). Also test for a retransmission of MSG from other toy Transmitter's State 5.

Transition Rules:

Go to State 4 if an ACK_ACK signal is sent to the receiver from the transmitter containing the same msg_id that was saved in State 1. This means that the transmitter did not find an error with the MSG_ACK sent in State 1.

Go to State 1 if the transmitter has resent MSG to the receiver (same msg_id as that saved during State 0).

Go to State 1 if timed out (retransmission of MSG_ACK)

State 4 (Transmit to Application Module)

Transmit the original message (from State 0) to the Application Module. Reset all relevant variables.

Transition Rules:

Go to State 0 always.

State Descriptions—Transmission Component (FIG. 15)

State 5 (Send Message)

Initial send state. If data is available from the application module, create a new message for it. Transmit the message. Keep track of the number of retransmissions of this message; limit it to 3. Wait a random period of time before retransmissions (see the Pragmatics section below).

Transition Rules:

Go to State 0 if no data is available from the Application Module.

Go to State 0 if the number of retransmissions of the message exceeds 3.

Go to State 6 after transmitting.

State 6 (Wait for MSG_ACK)

Wait for MSG_ACK from receiver. When the MSG_ACK comes, compare its content against the original message contents. If they are the same, continue to the next state; else retransmit the message to the receiver. Save the MSG_ACK msg_id.

Transition Rules:

Go to State 7 if the comparison is successful. Clear the ACK_ACK retransmission count.

Go to State 5 (retransmission) if the comparison is unsuccessful.

Go to State 5 if time out.

State 7 (Send the ACK_ACK message)

Create the ACK_ACK message (contents are the msg_id of the MSG_ACK) if not retransmission. Send the ACK_ACK message to the receiver. Keep track of the number of retransmissions; limit to 3. Wait a random amount of time before retransmissions (see Pragmatics section below).

Transition Rules:

Go to State 8 if the number of retransmissions is not greater than 3.

Go to State 5 (MSG retransmission) if the number of retransmissions is greater than 3. Clear the ACK_ACK retransmission count.

State 8 (Wait for a MSG_ACK retransmit)

Wait to make sure the Receiver has gotten the ACK_ACK. If the Receiver didn't get the ACK_ACK, it will timeout in State 2 and try to retransmit the MSG_ACK from State 1. If a MSG_ACK is received then go back to State 7 and try resending the ACK_ACK.

Transition Rules:

Go to State 0 if time out. (Success) Clear all relevant variables.

Go to State 7 if the MSG_ACK from State 1 is received (compare against saved MSG_ACK msg_id from State 6). Clear the ACK_ACK retransmission count.

Pragmatics

Message Handling

Messages preferably are stored in the Messenger layer bit arrays. Preferably, a set of accessor routines are programmed which, when given a message bit array, are able to retrieve the sender, receiver, msg_id, msg_type, and msg_content fields. Routines which are able to recognize a message header and footer within a stream of bits are preferably also present.

Time Outs

Most of the states are looking for very particular messages in their two-way communication session. It may be that other noise sources (loss of transmission, noisy channel, other units) will mangle the transmission. Thus, every "wait" state (i.e. States 2, 6, and 8) has a time out which reverts them back to a previous "send" state. The time outs should be of sufficient length to allow the other unit to at least send a message begin field to the current toy/unit.

Random Time Retransmissions

A systematic error for garbled messages is when different units attempt to transmit at the same time. Thus it is necessary for retransmissions to provide some variations in start times. This is achieved by waiting a period of time between retransmissions with some randomness thrown in. For example, suppose that the maximum message transmission time is X seconds. Then a retransmission request may wait 5*X+U(0,1) seconds (where U(0,1) is the uniform distribution between 0 and 1) before commencing retransmission to minimize chances of interference.

Application Layer

The Application layer is responsible for the overall control and enactment of the toy capabilities. The Application layer consists of two elements: a process which defines how multiple, independent toys may coordinate with each other to hold seemingly spontaneous conversations about various topics and a set of internal representations (i.e. data structures) which enable the above process. Every toy implements the process and internal representations.

Internal Representations

The process determines how the toys interact but does not define the basis of the interaction. This basis may be described by the internal representations, or data structures, which circumscribe the content of the interaction by their design. It should be noted that a particular toy's content is not being defined, but rather a framework in which content is defined and organized.

Decision Graphs

Figure 16:
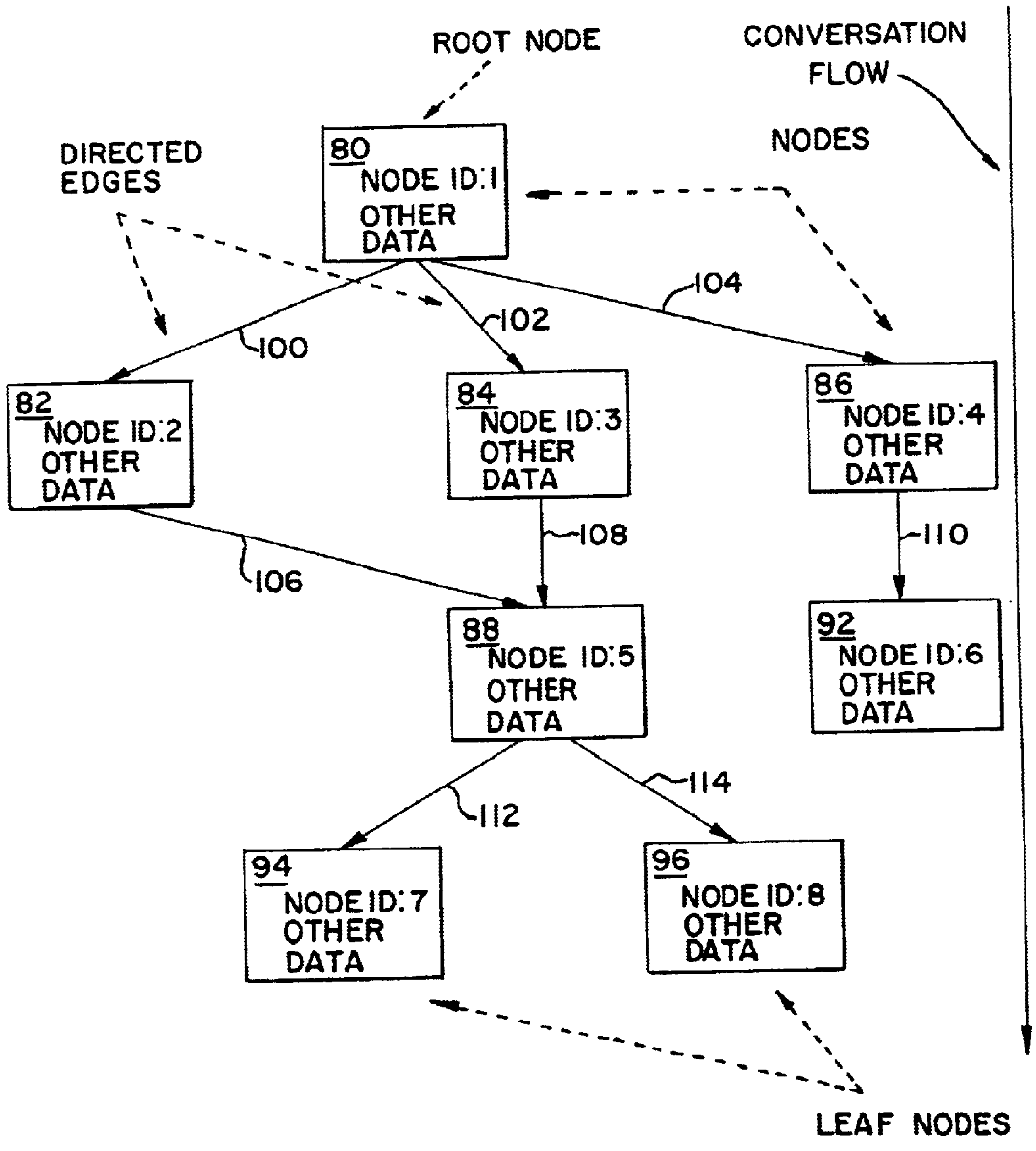
FIG. 16 is an illustration of a decision graph of the type used by an embodiment of the toy of the present invention.

The key data structure utilized by the invention, a Decision Graph, is a compact representation of many possible conversations and the technology necessary to implement realistic conversations. FIG. 16 shows a high-level view of the form of a Decision Graph.

Decision Graphs consist of a set of nodes 80–96 (which represent pieces of conversation) connected together by a set of directed edges 100–114 (one-way edges) which define allowable transitions between nodes. Each node has a non-empty set of fanins (nodes connected to edges coming into the node) as well as fanouts (nodes connected to edges going out of the node). The fanin set for a given node is called the node's parents, while the fanout set for a given node is called the node's children. In a Decision Graph, a node may have multiple fanins and fanouts, although they may not have a Cycle (i.e. the occurrence of a loop in the graph which allows visitation of a node more than once during a graph traversal). Hence a Decision Graph has some of the key characteristics of a Directed Acyclic Graph (DAG). There are two types of special nodes in a Decision Graph: the top-most node in the graph 80 (i.e. the node with an empty fanin set) is called the root node; the bottom-most nodes in the graph 92, 94 and 96 (i.e. the nodes with empty fanout sets) are called the leaf nodes.

Each node represents a discrete unit of conversation encoded by the Decision Graph. Complete conversations are constructed by traversing (i.e. going from node to node) a Decision Graph from the root node to one of the leaf nodes of the graph. While at a given node, any of the children of the node may be selected as the next node in the conversation. Thus a single Decision Graph may encode a number of distinct conversations that still make logical sense (given that the Decision Graph's content is defined properly by the manufacturer of the toy).

From the above description, the Decision Graph structure appears to be quite similar to that of Directed Acyclic Graphs. However, Decision Graphs' representation is far more powerful than that of DAGs. Decision Graphs implement Contexts, which are flexible groupings of edges which organize the elements of a Decision Graph into smaller subgroupings. Contexts may be used to represent various emotional states of the toys, i.e. anger, sadness, surprise, fear, etc. Selection among the contexts in a given node may be deterministic (i.e. not left to chance) or non-deterministic (subject to random variation). Non-determinism of context selection may be biased on historical context (i.e. a history of the last n contexts selected coming into the current node, as in a Markov chain).

Figure 17:
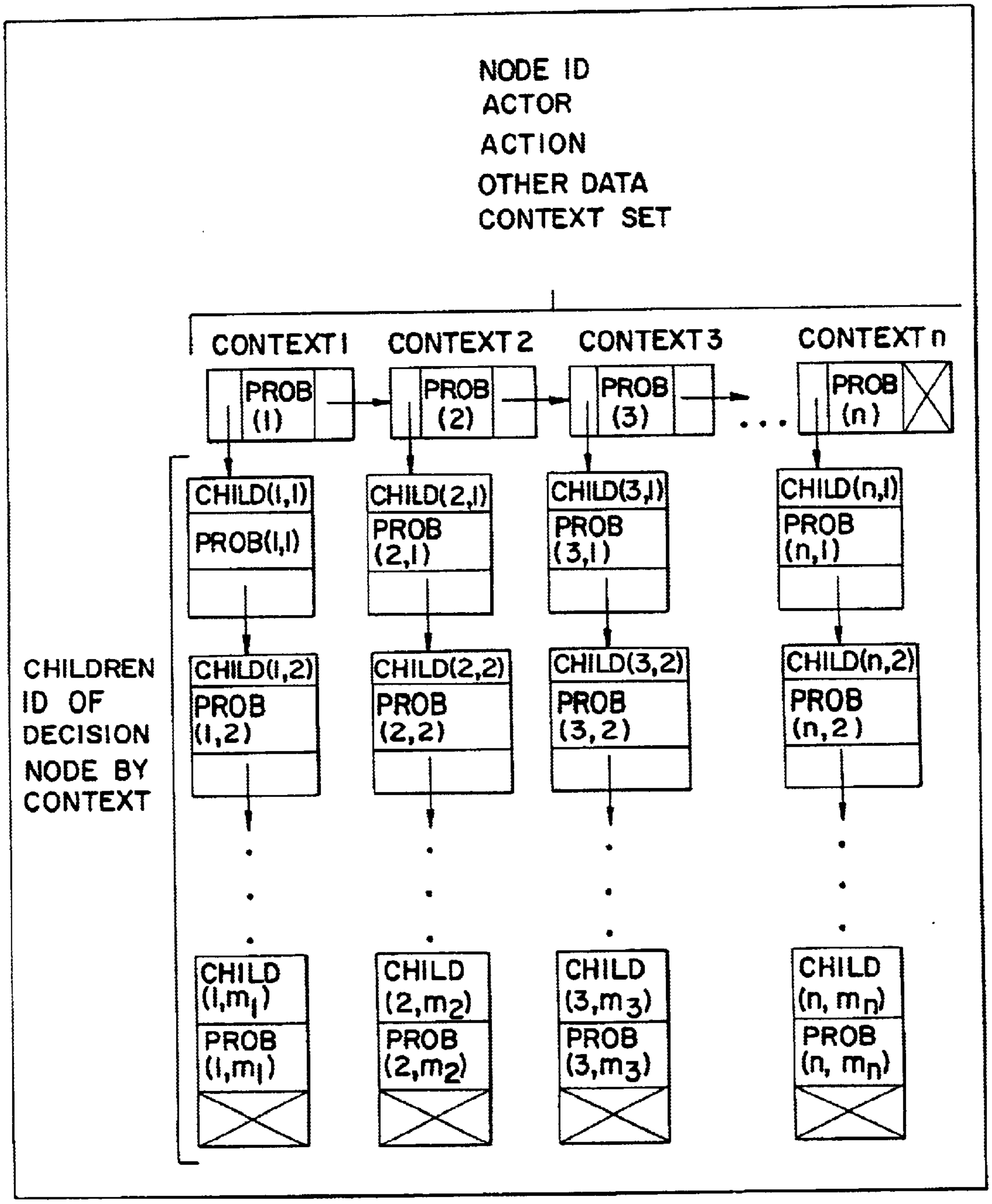
FIG. 17 is a detailed view of a node of the decision graph of FIG. 16.

FIG. 17 is a detailed diagram of a node within a Decision Graph. Each node has data fields: Node ID, Actor, Action, and Other Data. Node ID is the unique identifier of the node. Actor is the set of toys which perform an action for this node (i.e. speech or physical enactment). Action is the set of actions that the actors perform for this node. Finally, Other Data are all other associated data for the node. After these data fields comes the Context Set. In FIG. 17, there are n different contexts labeled Context 1 to Context n. There can be any number of contexts defined for a given node. Each context may have a probability associated with it, Prob(1) to Prob(n). It should be noted that these probabilities are optional and are used only when a non-deterministic traversal of the Decision Graph is desired. Also, it should be noted that a number of embodiments of the probabilities associated with Contexts are possible, including, but not limited to: 1) storing the probabilities within each node; 2) storing the probabilities within a global table available to all nodes; etc.

Each Context is linked to a set of Children Ids with their own associated probabilities. For example, in FIG. 17 Context 1 is linked to Child(1,1) to Child(1,$m_1$). These identifiers are the Node Ids of the $m_1$ children for Context 1 for this node. Thus Child(k,1) represents a directed edge in the Decision Graph. Thus, the above node has $m_1+m_2+m_3+\ldots+m_n$ children distributed among its n Contexts.

Each child may also have a probability associated with it, i.e. Prob(1,1) to Prob(1, $m_1$) for Child(1,1) to Child(1,$m_1$) when non-deterministic traversal is desired. Each Context has its own set of children, i.e. Child(2,1) to Child(2, $m_2$) for Context 2, and Child(n,1) to Child(n,$m_n$) for Context n.

Forests of Decision Graphs

Figure 18:
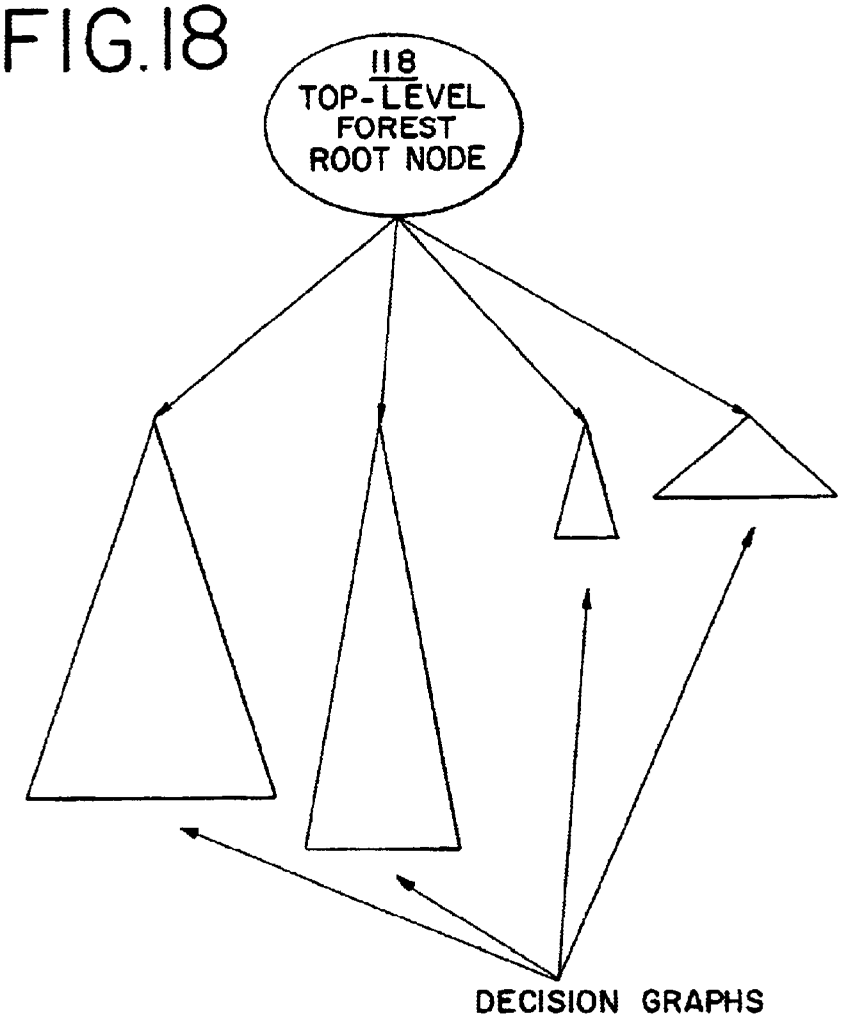
FIG. 18 is an illustration of a forest of decision graphs.

Each toy contains a set or "forest" of Decision Graphs. All of these Decision Graphs are linked together by their root nodes to a top-level forest root node 118 (FIG. 18). Each Decision Graph (shown for simplicity as a triangle) represents a set of potential conversations. Special decision graphs may exist to implement particular conversational scenarios, for example welcoming a toy into an existing conversation, or dismissing a toy from an existing conversation. In this case, the conversational flow may jump from within a given Decision Graph to another Decision Graph and then return to the original graph.

Process

Figure 19:
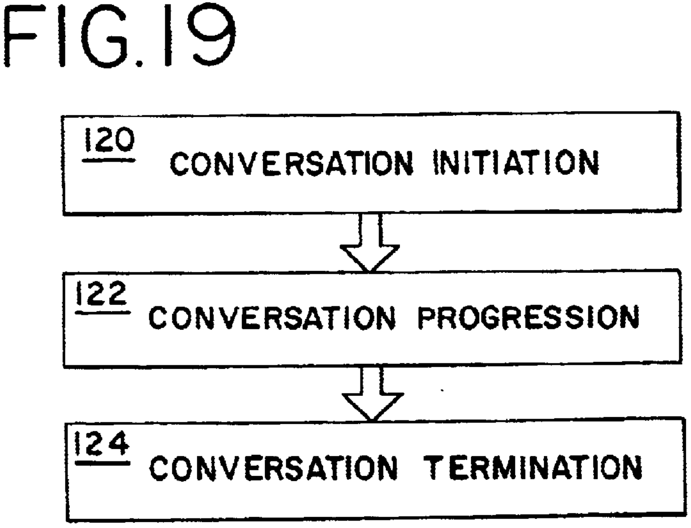
FIG. 19 is a block diagram of a conversation process for an embodiment of the toy of the present invention.

The process of controlling multiple toys interacting with each other may be divided into three sequential sub processes, as shown in FIG. 19:

Conversation Initiation 120 is the process by which a set of independent toys coordinate to initiate a conversation. In this context, the Conversation Initiation process covers the behavior of a toy starting from when it is turned on to the point where a group of toys participating in a conversation (a Conversation Group) has been created, a "manager" has been selected to initiate and to handle error situations (the Conversation Manager), a conversation for the Conversation Group has been selected, and all of the toys have been notified of the conversation.

Conversation Progression 122 is the phase in which the toys interact with each other to play out a conversation based on their internal representations of the conversation (a Decision Graph). This process, like the other processes, must be robust enough to survive many error conditions.

Conversation Termination 124 is the process by which the current conversation ends and in which all of the toys are "reset" to the Conversation Initiation process.

The set of all toys participating in a given conversation is called the Conversation Group. Each toy of a Conversation Group is an Actor, i.e. a toy which is called upon to perform actions during the course of a conversation.

Every Conversation Group must have a Conversation Manager. Selected during the Conversation Initiation process, the Conversation Manager is central to this process and the subsequent Application layer tasks illustrated in FIG. 19. The Conversation Manager is responsible for selecting, initiating and sustaining the conversation, and helps to resolve error situations. The Conversation Manager may change dynamically during a conversation. Situations where the Conversation Manager may change are, but are not limited to: 1) the existing Conversation Manager is removed from the Conversation Group; 2) load-balancing purposes (i.e. the current Conversation Manager is overloaded from its duties as an Actor). A Conversation Manager is also an Actor in its Conversation Group.

Once a toy is elected as the Conversation Manager, it will have to perform a number of roles in addition to participating in the present conversation. For example, the Conversation Manager (CM) selects a conversation. More specifically, it is the CM's responsibility to pick a single Decision Graph that represents a "line, of conversation" along with its deviations. The CM must pick a Decision Graph root node that corresponds to one of the actors in its current active conversation group list. This will ensure that the conversation always has an actor who is active start off the conversation.

The CM also maintains the active actor list. During the conversation the CM will, at regular intervals, broadcast a CONV_UPDATE Message. This Message has a reserved id field indicating that it is a CM transmission, the sender is assumed to be the current CM and the receiver is the current membership of the Conversation Group. This transmission, when received by a toy/actor will cause the receiving toy/actor to update its own list. There is no MSG_ACK to this message except for the case when an actor who believes itself to be on the Active list finds that it is not included on the transmitted list. In this case it transmits its INITIATION Message to the CM and continues to do so after every CONV_UPDATE message that it finds itself not included in.

When a first toy fails to communicate with a second toy that needs to carry on the conversation, the first toy shifts the second toy to its doubtfuls-list and then transmits this information to the current CM. All such modifications are received, processed and then reflect in the next CM's CONV_UPDATE message. All CONV_UPDATE Messages are transmitted in triplicate with the same message tag (randomly generated).

Conversation Initiation

Conversation Initiation is the process by which a set of independent toys/units coordinate to initiate a conversation.

Conversation Initiation may be broken down into three phases:

1. Initiation Transmission/Conversation Manager Selection;
2. Conversation Selection by the Conversation Manager;
3. Conversation Notification by the Conversation Manager to the Conversation Group.

The Initiation Transmission/Conversation Manager Selection phase covers the initial stages of coordination between units. In this phase a number of units have been brought together and they must discover each other and select a Conversation Manager for the next phases of conversation initiation.

Given a set of units with unique integer ids, or Global Identification Numbers (GINs) the Conversation Manager is defined as the unit with the highest-valued id.

Figure 20:
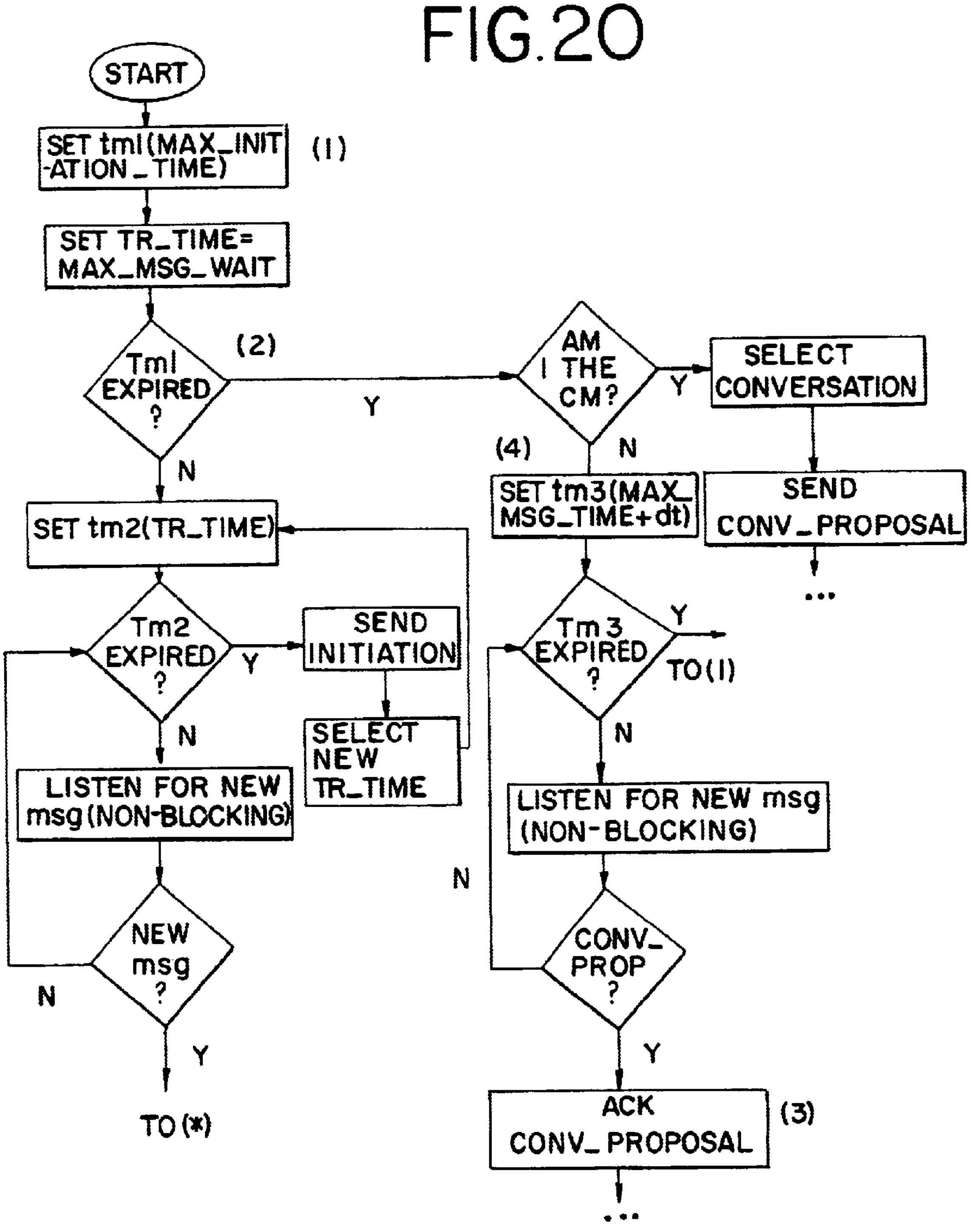
FIG. 20 is a flow chart of the initiation transmission (part 1) of an embodiment of the toy of the present invention.
Figure 21:
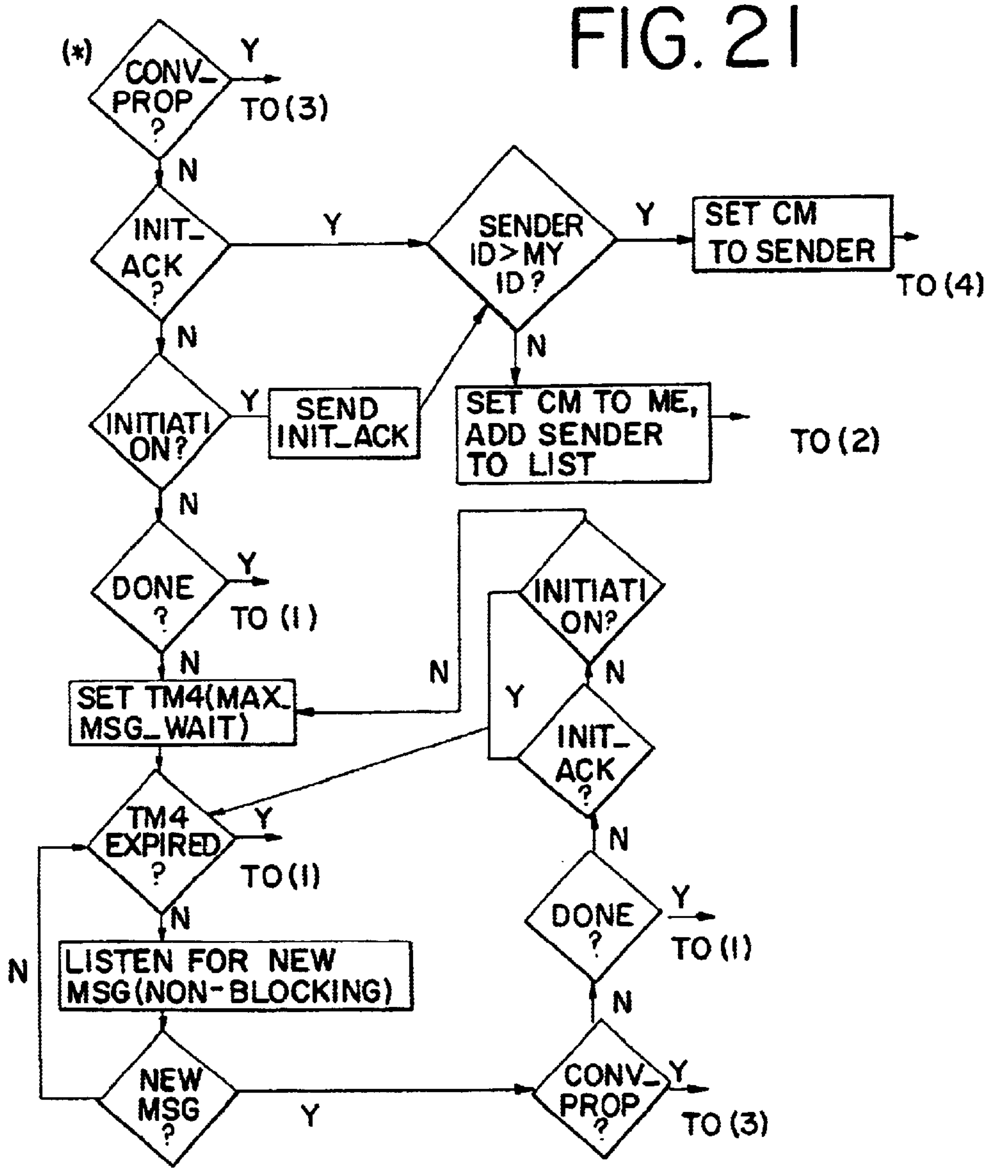
FIG. 21 is a flow chart of the initiation transmission (part 2) of the toy of FIG. 20.

FIGS. 20 and 21 show a flowchart of the initiation transmission phase. It should be noted that there are four types of messages being sent during this phase:

1. INITIATION—a message which is empty except for the Sender field/from_id. It is used as a "ping" to locate other units. Note that this is a "broadcast" message, i.e. one that does not have a Receiver field/to_id specified.
2. INIT_ACK—a message which is empty except for the from_id and to_id. It is used to respond to an INITIATION message that has been received and is used to identify the recipient of the INITIATION message to the sender.
3. CONV_PROPOSAL—a message which contains the from_id and the node id of a proposed conversation in the message content field. This is also a broadcast message.
4. DONE—a message which contains a from_id and which signifies the end of a conversation (a broadcast message). The DONE message is never sent during conversation initation, but when received during unit operation it restarts the initiation transmission phase.

Several timer time periods are also specified in the flowchart:

1. MAX_INITIATION_TIME: The amount of time that each unit spends actively sending INITIATIONs and INIT_ACKs to other units. The value of this time period is fixed.
2. TR_TIME: The amount of time before the next INITIATION transmission.

Considerably less than MAX_INITIATION_TIME, TR_TIME has a random component which avoids INITIATION collisions between different units.

3. MAX_MSG_WAIT: The maximum amount of time for a unit to wait between messages which are not INITIATION, ACK, or DONE messages. This is used as a timeout when the unit initially detects a conversation in progress but for some reason the conversation breaks up before a DONE message is sent. It is also used as the first TR_TIME period.

The initiation transmission flowchart implements a "Meek" interaction policy which involves the following coordination tenets:

1. A unit always "listens" before transmitting an INITIATION message. If it detects a conversation in progress it remains silent until a DONE message is received or it times out (MAX_MSG_WAIT) between receiving conversation messages between other units.
2. A unit keeps quiet (i.e. stops transmitting INITIATIONs and INIT_ACKs) when it knows that it isn't the conversation manager.
3. A unit always responds immediately to a CONV_PROPOSAL. In effect, any new CONV_PROPOSAL will always trump the existing initiation transmission process. The portions of the flowchart in FIG. 20 marked as " . . . " represent the continuation of the Conversation Initiation process.

The "Select Conversation" box in FIG. 20 represents the act of selecting a conversation given a known set of participants. The conversation is selected by selecting a Decision Graph root node. This action is performed only by the Conversation Manager. The Conversation Manager selects a Decision Graph from the subset of all Decision Graphs that contain a participant list that is a subset of the active/current participants list. The Decision Graph participant list contains the Actors for all nodes that are accessed when the Decision Graph is selected. As an example, assuming that the Conversation Manager has toys A, B, C, and D in the active participants list, then the CM will select a Decision Graph from all Decision Graphs that contain a subset of {A, B, C, D} (i.e. {A, B, C},{A, B}, or {A, B, C, D}).

The pseudocode for conversation selection picks a Decision Graph that is more likely to have contexts with a larger number of participants matching the current/active participants list. The pseudocode assumes that DECGR_ARRAY contains a list of indices to all of the Decision Graphs in the database. As described previously, each Decision Graph has a number of nodes, each of which includes one or more Actors or participants. As a result, each Decision Graph has a number of participants associated with it. Although the pseudocode does not specify a bit-wise encoding of the different participants it is recommended that toy A=00000001, toy B=00000010, toy C=00000100, etc. The pseudocode for conversation selection (selecting a Decision Graph root node) is as follows:

Select a context:

Randomly select an integer between 0 and MAX_CONTEXT.

Select the Decision Graph:

Set MATCH_VALUES to 0

Iterate through DECGR_ARRAY:

For each element DECGR of DECGR_ARRAY, check to see if it has a participant list that is the same as or is a subgroup of the current/active participant list.

If it is, count the number of matches between DECGR: participant list (a combination of the participants listed in all of the nodes in the DECGR) and the current participant list.

Divide the number of matches by the size of the current participant list. Save the result in the appropriate entry (between 0.0 and 1.0) in the float array MATCH_VALUES.

Add the result to MATCH_SUM

Iterate through MATCH_VALUES

For each element VALUE of MATCH_VALUES, divide VALUE by

MATCH_SUM and resave it into the VALUE element.

MATCH_VALUES is now a normalized vector of probabilities which sums to 1.0.

Select a random float between 0.0 and 1.0(RAND_NUM).

Iterate through MATCH_VALUES:

For each element VALUE of MATCH_VALUES, see if RAND_NUM<or =VALUE.

If it is, then select the root node of the Decision Graph corresponding to the element (using the indices in DECGR_ARRAY).

If it isn't, set RAND_NUM=RAND_NUM−VALUE and go to the next element in MATCH_VALUES.

Efficient indexing and matching of the active/current participant list and each Decision Graph participant list is essential. Preferably, bitwise representations for the Decision Graph and active/current participant lists are implemented. For example, Toy A with id 1 has a representation (00000001) and Toy F with id 6 has a representation (00100000). The active/current participant and Decision Graph participant lists are constructed by a bitwise OR of all of the different bitmasks for the units. For example, suppose the active participant list has Toys A, D, E, and G. Then the participant list would be encoded as 01011001. Then computing the intersection of the active/current and Decision Graph participant lists would be a simple bitwise AND of the two vectors and testing whether the Decision Graph participant list is a subset of the active/current participant list would be (!X)Y, where X is the participant list vector and Y is the Decision Graph participant vector. Computing the number of matches would be a loop counting the number of successful right shifts bitwise AND'ed with the 00000001 mask.

Once the conversation has been selected, the Conversation Manager broadcasts the initial conversation information in triplicate. This notifies all of the members of the Conversation Group of the selected Decision Graph, the identity of the Conversation Manager, the selected Context, the current node and the set of members participating in the conversation.

Conversation Progression

Once the Conversation Manager has been selected and the set of Actors in the Conversation Group notified of the conversation, the actual process of coordinating the traversal of the Decision Graph and of performing the conversation begins. The Conversation Progression process defines a general means of performing the above activities in a robust and efficient manner.

The key concepts within Conversation Progression are the following:

1. Control Methodology
2. Conversation Flow Framework
3. Error Handling The Control Methodology specifies the nature of how conversation flow is controlled during the conversation. The methodology may be centralized or distributed and depends on the expected nature of toy interaction. A key concept is the locus of control. The locus of control is the element within the Conversation Group that directs the flow of the conversation. In a centralized scheme, the locus of control tends to reside with a particular toy member of the Conversation Group. In a distributed methodology, the locus of control tends to shift between members of the Conversation Group. Many potential embodiments of the above framework exist, combining elements of centralized and distributed control.

An example of a centralized methodology would be where a single toy/unit (i.e. the Conversation Manager) performs all of the coordination and other command activities during the conversation. For example, in a centralized control methodology, the Conversation Manager would start the conversation and would traverse the selected Decision Graph. At each node the Conversation Manager would contact the Actor associated with the node and tell it to perform the action associated with the node. After the Actor completed the action, the Conversation Manager would then select the next node in the Decision Graph and contact the Actor associated with that node, etc. The Conversation Manager would be in charge of handling all errors and conversation termination conditions.

An example of a distributed control methodology is one in which a token is passed among the Actors in the Conversation Group. The owner of the token is the Actor associated with the current node in the Decision Graph. After the owner of the token has completed its actions, it selects a child node of the current node, and sends the token to the Actor associated with the child node. The owner of the token may also act as the Conversation Manager, handling error situations and other issues.

The embodiment described in detail below combines elements of a centralized and a distributed control methodology. It is centralized in that the Conversation Manager for this process is the one chosen during the Conversation Initiation process. This actor remains the Conversation Manager unless it is somehow removed from the Conversation Group. When this happens, a new Conversation Manager is selected. The selection of a new CM is described in the discussion of Error Handling below. The embodiment is also a distributed process in that the selection of the next node and notification of the Actor associated with the child node at any point in the conversation is performed by the Actor associated with the current node. This scheme reduces the burden of communication from the Conversation Manager. The Conversation Manager acts as a second line of defense if a problem is encountered with either the current Actor or the next Actor at any point in the conversation.

Having decided upon a control methodology, the Conversation Flow Framework defines the nuts and bolts of coordinating the actual conversation. It should be noted that there are two levels of "communication.": the underlying Messages passed via the Physical Medium (e.g. IR, RF, etc.) and the outward observable (to the human eye and ear) actions performed by the toys.

The framework consists of a sequence of point-to-point transmissions and broadcasts between the Actors in the Conversation Group. The examples below demonstrate an embodiment of a conversation flow between actors in a Conversation using the semi-distributed control methodology described in the previous section. It should be noted that the purpose of this example is to demonstrate the Conversation Progression process for a "normal" conversation. Error conditions and other issues are addressed in a subsequent section.

Figure 22:
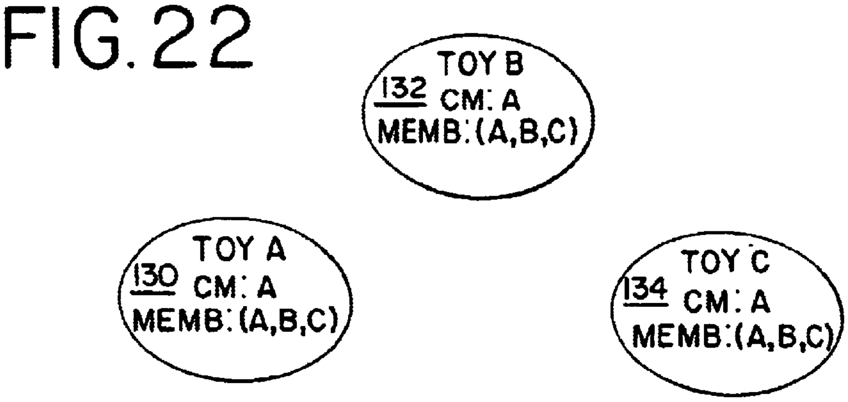
FIG. 22 is a diagram illustrating the initial state of the conversation flow framework for toys A, B and C constructed in accordance with the present invention.

The initial state of the Actors in the Conversation Group is shown in FIG. 22. There are three Actors: Toy A, Toy B, and Toy C, indicated at 130, 132 and 134, respectively. Toy A has been selected as the Conversation Manager, and all of the toys know that A is the CM (see the CM field values in each of the nodes). The current locus of control resides with A, with the other toys waiting for a bounded period of time for a Message from A. After the bounded period of time has passed, the toys assume that the Conversation Manager has been disabled and return to Conversation Initiation.

Figure 23:
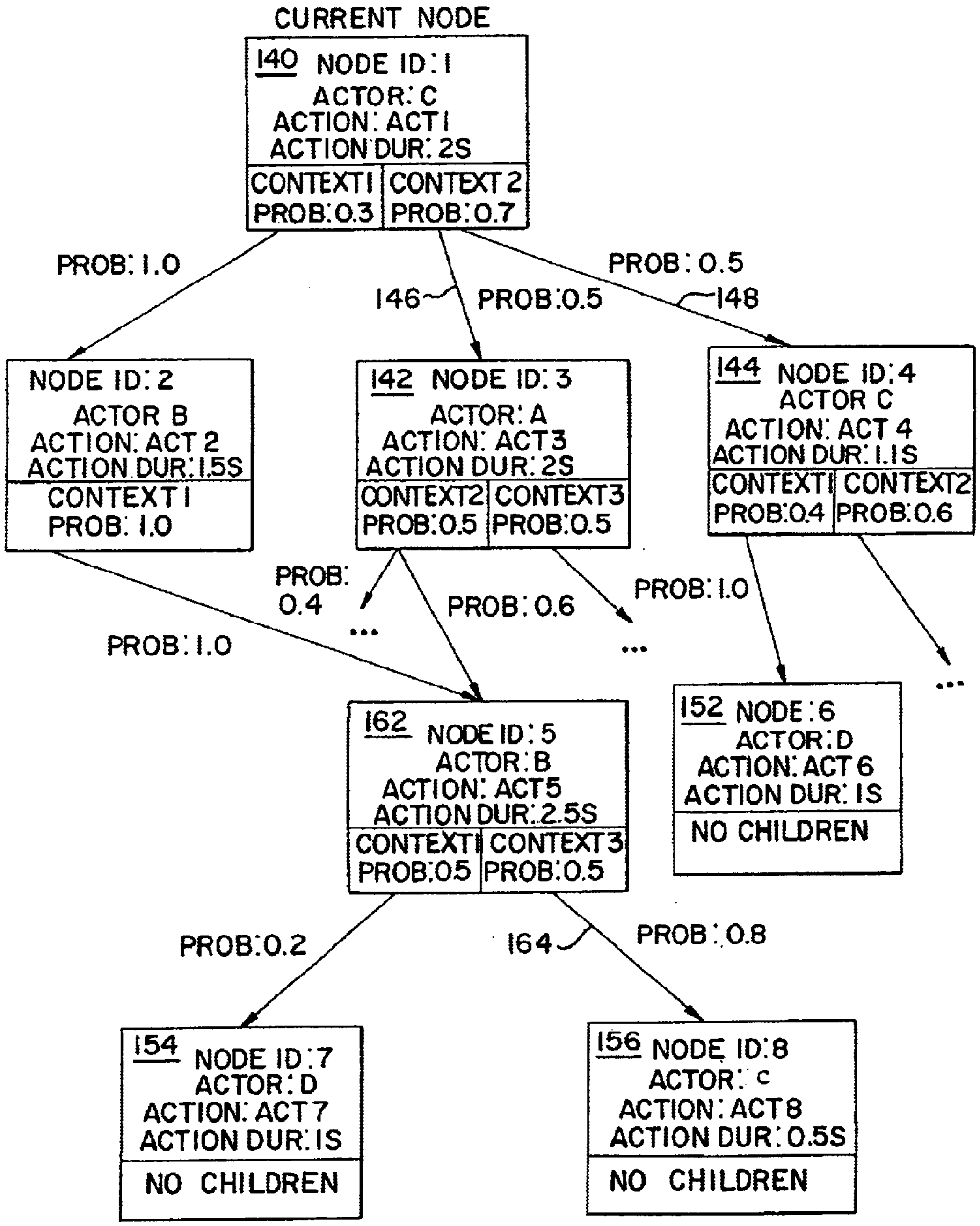
FIG. 23 illustrates the decision graph of the toys of FIG. 26.

The Decision Graph selected is shown in FIG. 23. This diagram is a combination of the high-level Decision Graph structure shown in FIG. 16 combined with some of the detail shown for each node in FIG. 17.

The current node 140 (Node 1, Node ID=1 at the top of the Decision Graph) is the root node of the graph. It should be recalled from the previous discussion that all of the toys have the same complete Decision Graph and all have the current node set to the Node 1 During the conversation, all of the toys listen to the Messages passing between various toys and update their internal representation to reflect the current node in the Decision Graph. Each node has a Node ID, an Actor, an Action, and an Action Duration. The Node ID is a unique identifier for each node (all nodes in all Decision Graphs have unique Ids). The Actor field contains the identifier of the Actor(s) performing the Action for the current node. The Action field contains the identifier for the Action or Actions associated that the Actor(s) must perform for this node. Finally, the Action Dur (Action Duration) field contains the estimated time required for the Actor to perform the Action. The portion below these data fields contain the Contexts defined for each node. There are three overall Contexts, labeled Context 1, Context 2, and Context 3. Each node may not have every Context associated with it. For example, Node 1 has two associated Contexts, Context 1 and Context 2; Node 2 is associated with only Context 1; the leaf nodes of the Decision Graph have no children and hence no associated Contexts at all. Each Context associated with a node has a probability assigned to it. For example, in FIG. 12 Node 1 has probability 0.3 associated with Context 1 and probability 0.7 associated with Context 2. Note that the sum of the probabilities for all of the Contexts for a Decision Node sum up to 1.0. This means that during traversal one of the Contexts must be selected. Other representations of probabilities are possible and, of course, in the case of deterministic traversal the Contexts would have no associated probabilities.

The process uses these probability values to compute the next Context in the conversation. Each Context may link to one or more children. Again using Node 1 as an example, Context 2 links to Nodes 3 and 4, 142 and 144 in FIG. 23, as shown by the arrows 146 and 148, respectively, from Context 2 to those nodes. The probability values labeling each arrow are the probability of visiting the child node. Thus once Context 2 is selected the traversal may go to Node 3 or Node 4 with equal probability (prob=0.5 on the arrows). The sum of all the probabilities for all the children linked with a particular Context also sums to 1.0. This means that after a Context has been selected, one of its children must be visited. In the case of no children and/or Contexts, the node is a leaf node (see Nodes 6, 7, and 8 at 152, 154 and 156, respectively, in FIG. 23).

Figure 24:
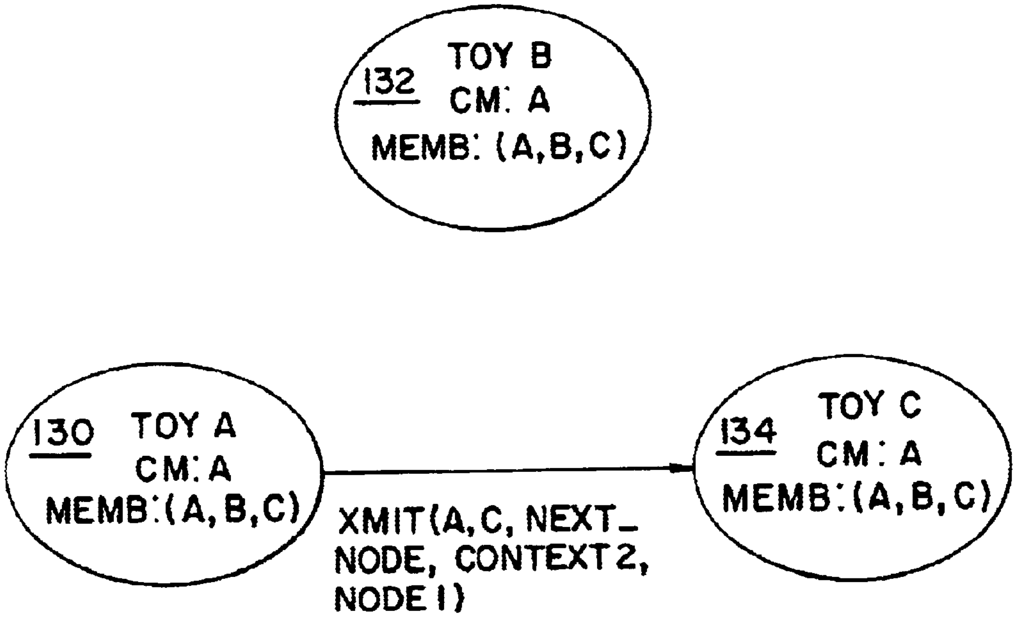
FIG. 24 is a diagram illustrating the conversation manager toy providing an initial notification to toy C of FIG. 22.

To begin the conversation, as illustrated in FIG. 24, the Conversation Manager (Toy A) sends a point-to-point message addressed to the Actor associated with Node 1 (Toy C). As discussed previously, the Conversation Manager also selects a starting Context, for example, Context 2. FIG. 24 shows the Message sent from Toy A to Toy C in a simplified fashion. XMIT(A, C, NEXT_NODE, Context 2, Node 1) means a point-to-point transmission with the following field values:

1. Sender is A
2. Receiver is C
3. Message Type is NEXT_NODE
4. Context is Context 2
5. Node is Node 1

NEXT_NODE is the Message Type which the current toy uses to notify the selected Actor that it is the next in line. Since this is a point-to-point transmission, a successful transmission means that the verification process defined in the Messenger layer was successfully completed. Thus A and C have successfully synchronized their states. In the meantime, B listens on the Physical Medium and picks up the NEXT_NODE Message; it updates its current node pointer for the Decision Graph to be Node 1.

Since Node 1 is the root node of the Decision Graph, and thus A has no action to complete, the locus of control immediately shifts to C. The first action C performs is to select the next node in the Decision Graph. It has two Contexts to select from, Context 1 (with probability 0.3) and Context 2 (with probability 0.7). C elects Context 2 based on the results of a randomly generated value. As indicated by the probabilities, the randomly generated value has a 30% chance of selecting Context 1 and a 70% chance of selecting Context 2. It should be noted that this is a "stateless" process in which the previous Context doesn't count. Other embodiments are also possible. For example, a history of the previous Contexts may be maintained and a function computed to bias the probabilities in favor of the most recently used Context. The history may have length 1 to the entire history of the conversation.

Alternatively, the context choice may be more heavily weighted towards contexts which involve more of the participants rather than fewer of them. As such, a context with nodes that involve {A, B, C} is more favored than a context with nodes which only involve {B, C}. Thus the context selection algorithm performs a probabilistic computation based on the "goodness of fit" of a given context to the current set of participants. "Goodness of fit" may be defined as: (number of matches between current participant list and context participant list)/(total number of elements in the current participant list). For example, suppose that the current participant list is {A, B, C, D}. For a context which contains {A, B, C}, the "goodness of fit" is ¾ or 0.75. For a context which contains {A, B, C, D}, the "goodness of fit" is 1. If the context participant list includes a toy that is not in the current participant list, the algorithm automatically sets the "goodness of fit" equal to zero.

Figure 25:
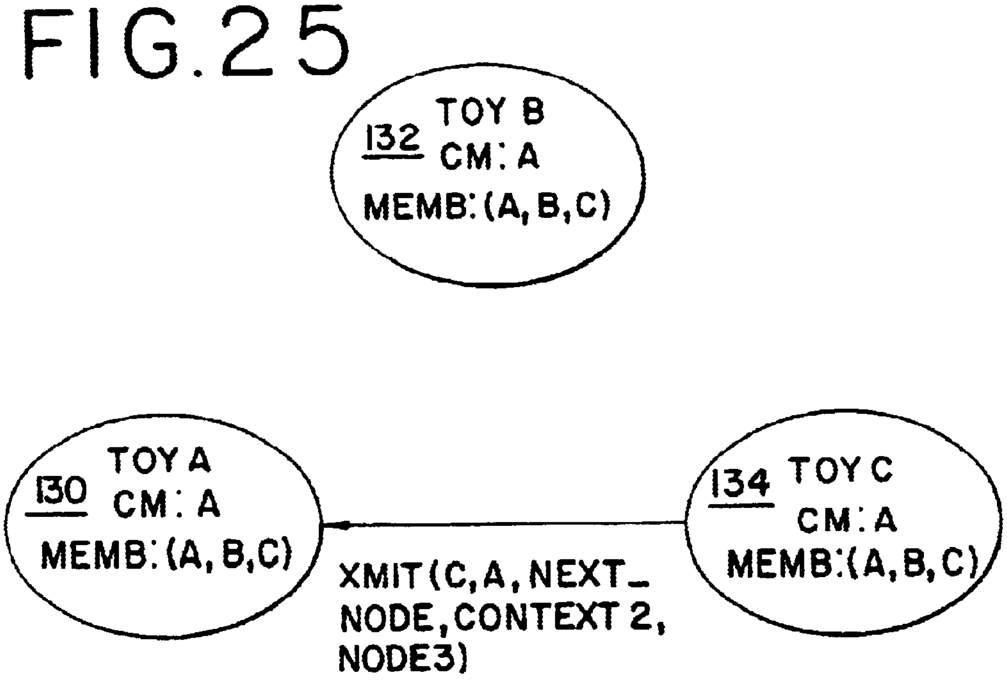
FIG. 25 is a diagram illustrating toy C transmitting a NEXT_NODE message to toy A of FIG. 22.
Figure 26:
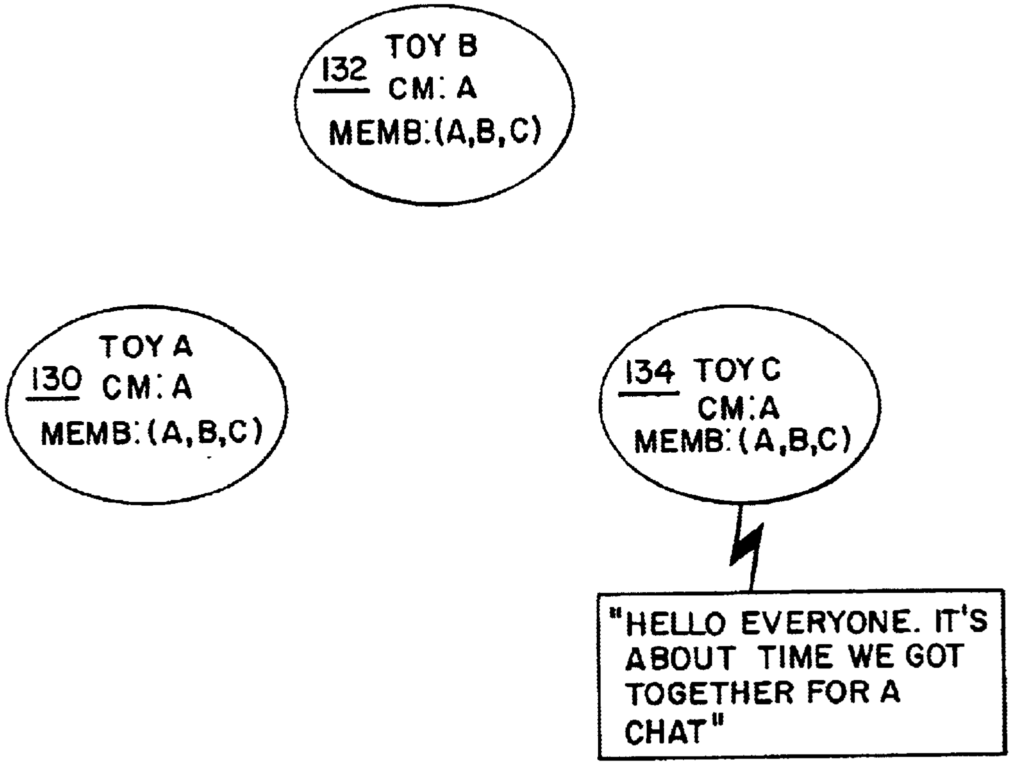
FIG. 26 is a diagram illustrating toy C performing its action.

Once Context 2 has been selected, the child node under Context 2 is selected. For Node 1, there are two possibilities, Node 3 (with probability 0.5) and Node 4 (also with probability 0.5). Again, the child is selected based on the results of a randomly generated value, this time with a 50% chance of choosing Node 3 and a 50% chance of choosing Node 4. Suppose that Node 3 is selected. C retrieves the Actor for Node 3 (A) and transmits a NEXT_NODE message to A (FIG. 25). However, in this case the locus of control doesn't shift immediately to A since the node (Node 3) is not a root node of a Decision Graph, instead, A receives the Message and waits for an ACTION_COMPLETED Message from C. A also knows about how long to wait for C, since it knows that the current node's Action Duration is 2 seconds; After successfully transmitting the NEXT_NODE Message to A, C immediately begins to perform the Action associated with Node 1, as shown in FIG. 26.

Figure 27:
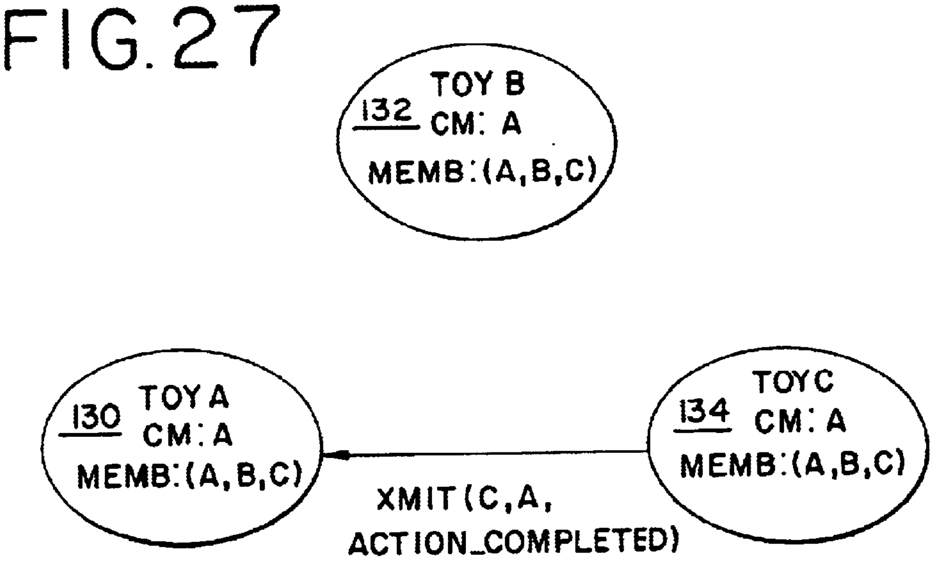
FIG. 27 is a diagram illustrating toy C sending an ACTION_COMPLETED message to toy A.

In this case, the Action is a speech clip where C greets the other members of the Conversation Group. Once the Action is completed, C sends an ACTION_COMPLETED Message to A, as shown in FIG. 27. At this point the locus of control shifts back to A. A now gets to select the next Context and child node. B also notices this Message and updates its internal representation accordingly.

The Conversation Manager also broadcasts the current conversation information at well-defined, regular intervals. This information may include the identification number of the current node of the conversation. This is to keep the toys in the conversation up-to-date about the status of the conversation and the existence of the Conversation Manager. This periodic update improves the consistencies of the toys' internal representations and also handles the error condition where the Conversation Manager is disabled or disappears during the conversation. This error handling case is described in a later section.

Figure 28:
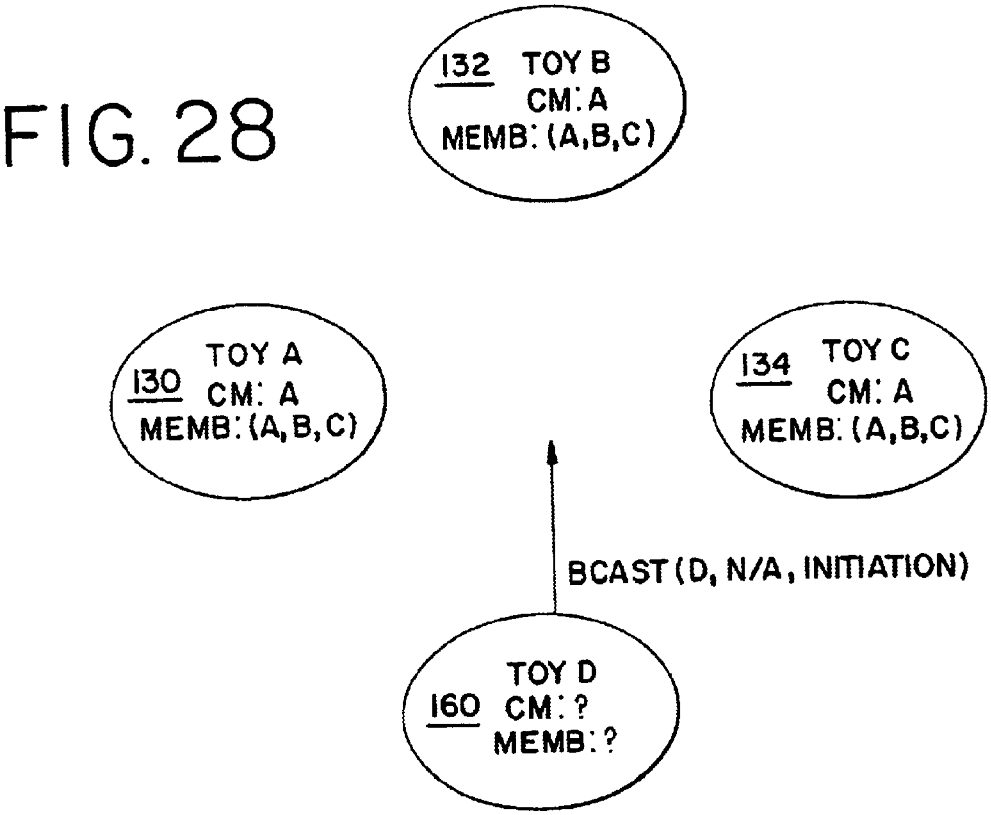
FIG. 28 is a diagram illustrating an additional toy D joining the toys of FIG. 22 and broadcasting an INITIATION request.

Suppose now another toy joins the conversation, Toy D. Toy D, indicated at 160 in FIG. 28, is performing a Conversation Initiation process and thus is broadcasting transmission requests. However, since the toys always listen to the Physical Medium before broadcasting, D's broadcast has little impact on the existing conversation. In other words, Toys A, B and C will not interrupt a transmission in progress to broadcast a response to Toy D's transmissions.

Figure 29:
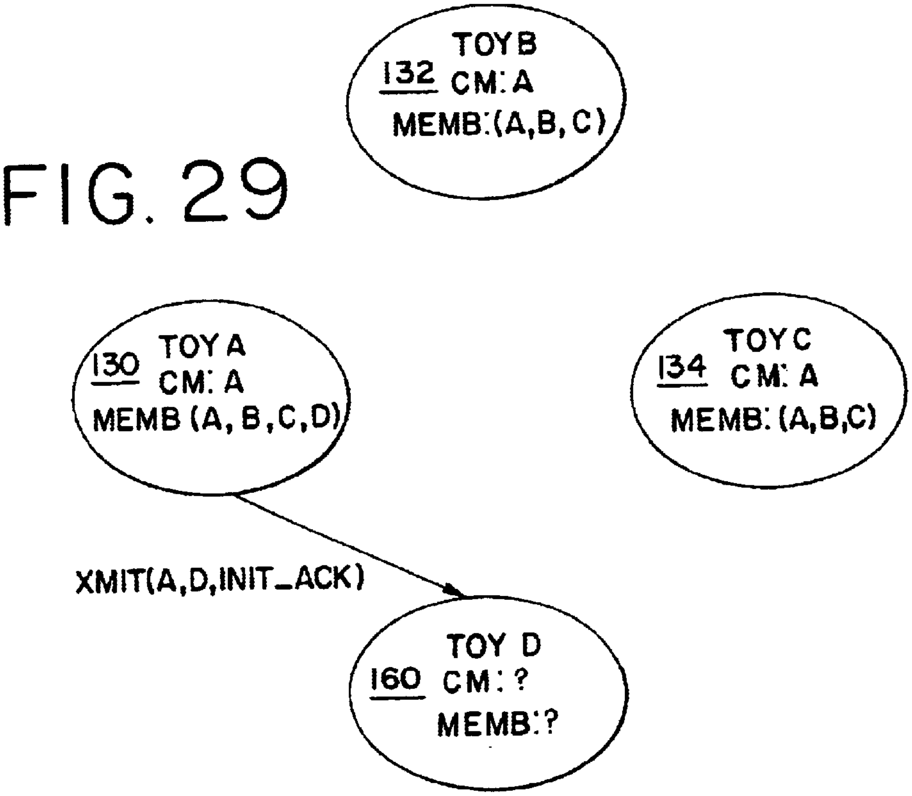
FIG. 29 is a diagram illustrating toy A transmitting an INIT_ACK message to toy D.

Only the Conversation Manager is allowed to respond to INITIATION requests at this point. A notices the INITATION broadcast from D and responds with an INIT_ACK, as shown in FIG. 29. Toy A's member list is now (A, B, C, D).

Figure 30:
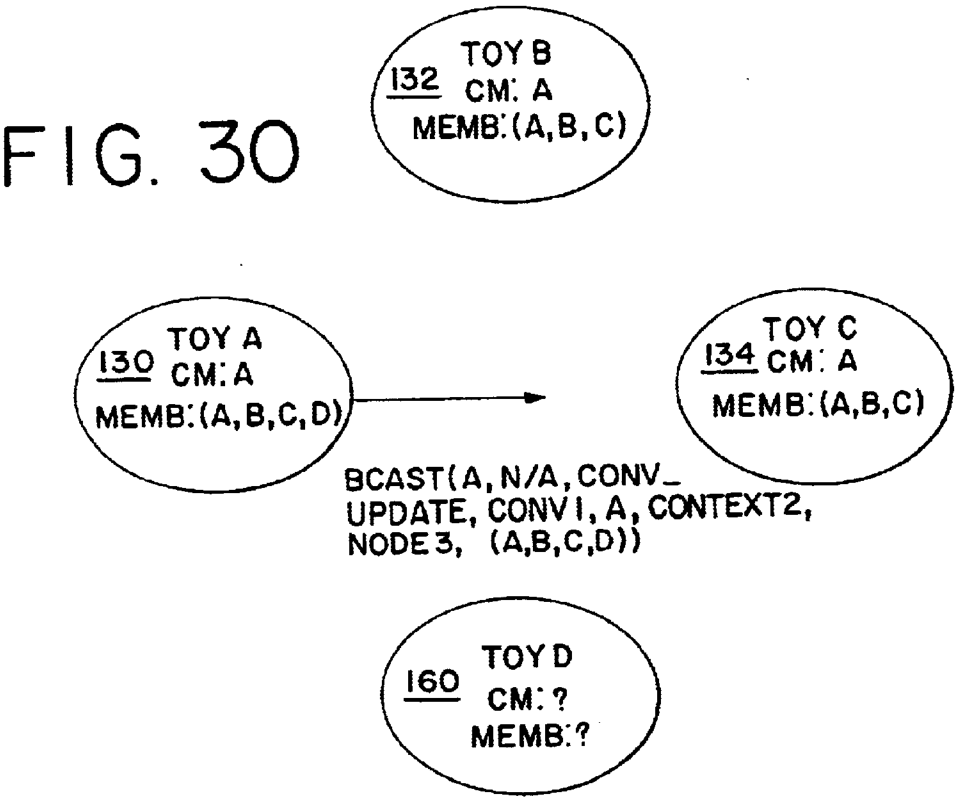
FIG. 30 is a diagram illustrating toy A broadcasting the current conversation context.
Figure 31:
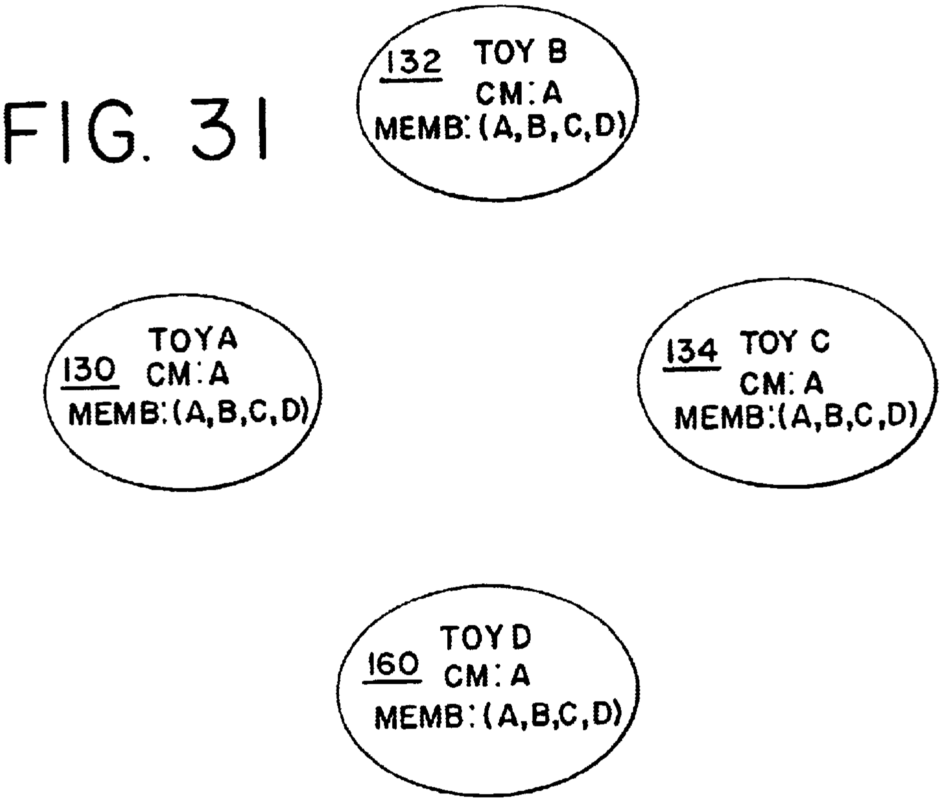
FIG. 31 is a diagram illustrating all toys updated with a complete conversational context.

After sending the INIT_ACK to D, A now broadcasts the current conversation context to all of the members of the Conversation Group (FIG. 30). This broadcast may be repeated 2–3 times to maximize the probability that all of the group members receive it; other embodiments are possible (e.g. point-to-point Messages to all of the members of the Conversation Group). After this step, all of the members of the Conversation Group (including D) now have the correct status (FIG. 31). Toy D is now a full member of the Conversation Group, and may participate in future parts of the conversation. A new decision graph (conversation) that includes D may now be selected by the Conversation Manager using the Conversation Initiation process described earlier.

Handling toys which are disabled or disappear and which are NOT the Conversation Manager is another common case. Referring back to FIG. 23, suppose that the current node is Node 5, indicated at 162, and that the locus of control is currently with B. Potential children for Node 5 are Node 7 (D), indicated at 154, and Node 8 (C), indicated at 156. The assumption is made that C leaves the conversation. There are three possible scenarios assuming that B selects Node 8 as the next node (arrow 164). These are discussed in the following three paragraphs:

If C leaves before B transmits the NEXT_NODE Message to it. In this case, the XMIT fails and B looks for another child in the selected Context (Context 3). Since there are no more children for Context 3, B selects another Context (Context 1) and the child linked with the Context (Node 7). B moves C from its Active list to its Inactive list.

If C leaves after B transmits the NEXT_NODE Message but before the ACTION_COMPLETED Message. This case is similar to the above case in that the ACTION_COMPLETED Message transmission will fail, leading B to select another Context/child node. B moves C from its Active list to its Inactive list.

If C leaves after the ACTION_COMPLETED Message. This case is different from the above because the locus of control shifted to C and then it left the conversation. In this case a number of actions are possible; a potential embodiment is to have the Conversation Manager notice the lack of conversation progression and ask B to find another child node. Another method is to have B recognize that C is missing. Either the Conversation Manager or B moves C from its Active list to its Inactive list.

Cases where the Conversation Manager leaves the conversation are more complex and are described in the following section.

The Conversation Manager maintains a list of the currently active toys and a list of "doubtfuls". A toy is added to the latter list whenever it was once part of the conversation but now no longer is. This can be due to several reasons that will be explained in the following sections.

At the start of a conversation during the initiation phase, the active toys transmit their ids to broadcast their existence. Whenever a toy receives a broadcasted id, it updates its internal bit-string vector of the list of currently active toys. The second step of the initiation phase is to elect a conversation manager. This can be chosen at random or according to some scripted hierarchy. In either case, every toy will be capable of taking on the role of a conversation manager if elected.

Every non-CM actor during a conversation has an internal counter that is reset every time it receives a "CM_BRDCST_MESG" message. After the counter expires, that is, it has not heard from the CM, it will transmit a "ID_CURRENT_CM" message. This message has a unique id (which would be a reserved id for this particular message) and identifies the actor who is asking the question. Upon receipt of this message, any actor, excluding only the broadcaster, will transmit a "CURRENT_CM_ID" message. This message can be sent by any actor and will contain the actor id of the current CM according to it. Upon the receipt of this message, the actor who asked who the CM was will reset its counter. The toy/actor that transmits the "CURRENT_CM_ID" can only do so if it has heard from the current CM during its past counter reset. This will ensure that erroneous reports of an alleged CM are not propagated.

When an actor does not receive any replies to the "ID_CURRENT_CM" transmission he then transmits a "APPPOINTED_CURRENT_CM" message to the next actor in the hierarchy. Upon the receipt of a "APPPOINTED_CURRENT_CM" message, the recipient activates the CM routines and starts off by transmitting a "CM_BRDCST_MESG" message. Alternatively, if the selection process of the CM is not pre-scripted and is random in nature, then the actor, which did not receive a reply to its ID_CURRENT_CM transmission, does not transmit any "APPPOINTED_CURRENT_CM" messages but instead appoints itself as the new CM and then transmits a "CM_BRDCST_MESG" message.

A case to be considered is the situation wherein a pre-scripted CM election paradigm and is used and some actor receives a "CM_BRDCST_MESG" message from some actor that is lower down in the CM hierarchy. A point to note here is that if there are two actors in the hierarchy that are both higher up, then the highest one will elect to be the next CM. This is achieved by the toys consulting the active participant list before wanting to be CM. Upon receipt of the CM_BRDCAST_MESG, the higher actor transmits a "REQUEST_CM_STATUS" message to the current CM/lower actor. This is followed by a transmission of the "APPPOINTED_CURRENT_CM" message by the lower actor and the new CM then broadcasts the "CM_BRDCST_MESG".

Conversation Termination

When a leaf node is encountered in the Decision Graph, the conversation has ended. The Actor associated with the leaf node (i.e. Actor D for Node 7) broadcasts a CONV_DONE Message in triplicate. Any toy that encounters a CONV_DONE Message immediately returns to the Conversation Initiation process and waits a random interval of time before broadcasting its INITIATION Messages.

Inter-series Communication

Figure 32:
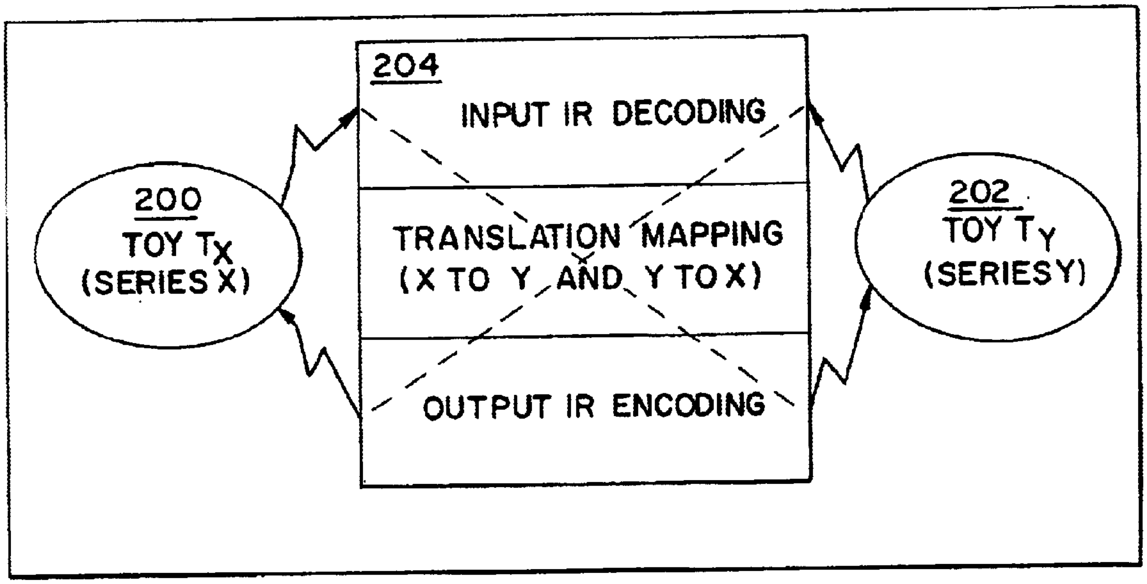
FIG. 32 is a block diagram of the translation mechanism of an embodiment of the toy of the present invention.

With reference to FIG. 32, the process of inter-series communication, or where the toys of one series 200 converse with toys from another series 202 requires a translation mechanism 204 quite similar to a human translator acting as a go-between between two speakers. A device capable of translation between two series of toys must have a complete understanding of the language of each series. In the case of the toys, that would mean that the translator has the complete forests of Decision Graphs for each series of toy. As mentioned before, for a given toy series there is only one forest of Decision Graphs that is globally applicable across that series.

Further there must be links between the two forests of Decision Graphs that the translator possesses (while the assumption is made that the translator can translate between two series only, the same principles may be applied to build a n-language translator). Since links in each forest of Decision Graphs are context sensitive, the links across the forests of Decision Graphs must translate context as well.

The last inter-series translator component needed is the transmission/reception circuitry that will take the transmitted input from one toy and translate it into the transmission input for the other toy and vice versa.

Special Intra-series Communications Issues

Figure 34:
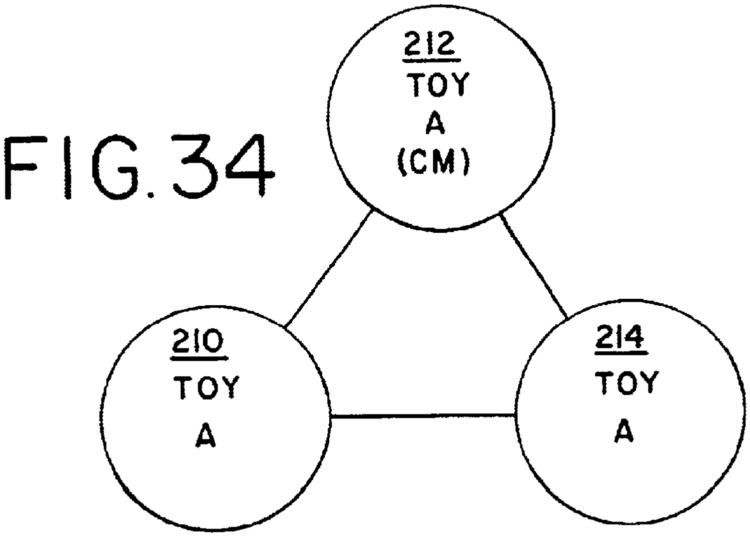
FIG. 34 is a diagram illustrating a set of duplicate/redundant toys A.
Figure 35:
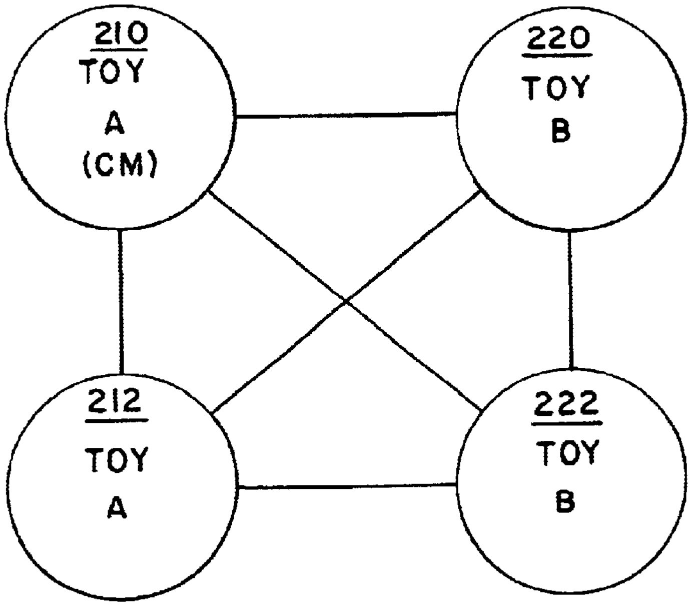
FIG. 35 is a diagram illustrating two sets of duplicate/redundant toys A and B.

Important issues that need to be taken into consideration and specifically addressed are the cases where there is only one toy present, are only a number of the same toys present or two or more sets of the same toys present. These situations are illustrated in FIGS. 33, 34 and 35, respectively.

Toy by itself

Figure 33:
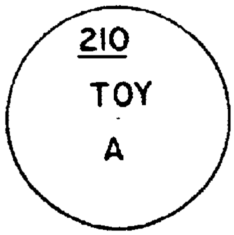
FIG. 33 is a diagram illustrating a toy A by itself.

A situation where one Toy A (210) is by itself is illustrated in FIG. 33. Such a situation may be accommodated by a toy wherein each of the nodes in its forest of Decision Graphs is equipped with a flag (an extra bit) that is set when a button on the toy, or some other activation device, is pressed. When the flag is set, the nodes point to a conversation index in the speech storage area which could be associated with a "one liner" or a "punch line" specific to that toy. As a result, when the button is pressed, the toy will randomly select and play one of these sentences.

Alternatively, there may be special "monologue" Decision Graph which involves only a single toy. These monologues can be thought of as the many personalities that a character (toy) could have or the different viewpoints that the same toy could have over a topic of conversation (within a context). These Decision Graphs are identical to the normal Decision Graphs that the toy has except they do not have probability values for selecting contexts. That is, they will not switch contexts. If only one toy is present, it will act out various parts of the monologue Decision Graph.

One Set of Redundant or Duplicate Toys

A scenario where a number of redundant or duplicate toys, 210, 212 and 214, are present is illustrated in FIG. 34. In order to accommodate such a scenario, the toys of the present invention may be configured to simply ignore messages from a redundant or duplicate toy as if they do not exist.

An alternative approach may be implemented using the notion of "monologue" Decision Graphs described above with reference to FIG. 33. In addition, each character of a particular toy series may come with a Global Identification Number (GIN). This is a simple series counter that can be issued at the time of manufacture that identifies a production number. In the case where there are multiple instances of the same toy present, the "Receiver" and "Sender" fields can be the GIN for the appropriate toys. As a result, the strategies for choosing the CM described previously for accommodation of new toys joining a conversation (assuming that they are also of the same type), disappearance of toys from a conversation and the CM election process may be utilized.

Two or More Sets of Redundant or Duplicate Toys

FIG. 35 illustrates a situation where there are two sets of redundant or duplicate toys present (210, 212, 220 and 222). Such a scenario may be handled by four alternative toy configurations or embodiments.

In the first, only a single instance of each toy type can interact with each other. This can be arranged by the Conversation Manager, which can reject the redundant or duplicate toys from participating within a given conversation by issuing a special "suppress_conversation" message upon their detection that makes them "be quiet" (not issue conversation proposal messages) until the end of the conversation is detected.

In the second embodiment or configuration, every instance of each toy for each toy type can interact with each other. This means that in FIG. 35, either instance of Toy A could potentially interact with either instance of Toy B. This requires a mechanism for mediating between instances of a given toy type when a node is reached in the selected conversation which specifies that toy type as actor.

During conversation initiation, the elected Conversation Manager not only keeps track of the toy types in the conversation (via the active participant list), but also transmits the GIN for each toy. For example, it is assumed that the toys in FIG. 35 have the following ids:

| Toy Type | Toy ID |
|---|---|
| Toy A (CM) | 121 |
| Toy A | 14002 |
| Toy B | 33123 |
| Toy B | 14002 |

The GINs may be distributed to each toy within broadcasts that the CM sends to each toy. The association of toy types and toy GINs may be distributed when the CM broadcasts the set of active participants list to the toys in the conversation. Thus each toy in the conversation is uniquely addressed for the duration of the conversation, and the initiator and maintainer of the unique addresses is the Conversation Manager. Every toy in the network has a copy of the unique addresses so if the conversation manager disappears, then any potential successor also has the latest toy data. The Receiver field in the basic message structure can be used to hold the unique toy id rather than the toy type and the toy type can be passed as data within the body of the message.

Thus it is assumed that all the toys in the conversation know the above association. When a toy selects the next node in the conversation Decision Graph, it also looks at the above association list to select a toy GIN. It then sends the message to that toy GIN that is a unique toy in the network.

The third configuration or embodiment serializes the operation of the multiple toys for each toy type. The fundamental problem is that if there are two instances of Toy B in the conversation, how are they prevented from responding simultaneously to a request for "Toy Type B"? A way of handling this is to use token-passing. Each set of identical toys in the conversation has a token which belongs to a single toy within the set at a time. Only the toy with the token can respond to a message to that toy type. When the toy is finished with its processing, it passes the token to another member of the set of identical toys. Thus, in FIG. 35 there would be two tokens—one that is passed among the toys of type A, and another that would be passed among the toys of type B. The conversation manager is solely in charge of issuing tokens. If a toy disappears with a token, the conversation halts until the conversation manager issues another token to the surviving members of the toy set.

In a fourth embodiment or configuration, each set of redundant or duplicate toys elects a CM and manages their own group. In this case, however, the CM of a particular toy type will act as the IR (or other medium) transmission spokesperson for that group. That is, the IR (or RF, etc.) transmission between groups of toys will take place only thru their CM spokesperson. Once a spokesperson receives a transmission it will randomly choose a member of its group (using the internal GIN information for that group) to whom the transmission will be addressed. There can be several variations on this process of choice. It could be as simple as picking, at random from the local CM's GIN list or the local CMs selecting multiple GINs (both toys say the same thing but only one of them proceeds with the conversation). Alternatively, the ability of choice can be as complex as sending the transmission to one toy and dummy transmissions to others within the sub-group.

CONCLUSION

The potential for the toys of the present invention is enormous due to all the factors mentioned above and the ability to use the technology in different series of toys. The latter allows the present invention to find use in toys of the past, present and the future.

The variety of applications for the toy of the present invention is also enormous. For example, the technology may be used to develop toys that behave like a teacher and a student so that a child will be motivated to sit down (along with the student toy) and learn what the teacher toy instructs. Language skills, grammar and mathematics are to name but a few of the subjects that may be taught by the toy of the present invention. Series of these toys can enact various historical events thus helping the child appreciate history and culture to a greater extent.

While the preferred embodiments of the invention have been shown and described, it will be apparent to those skilled in the art that changes and modifications may be made therein without departing from the spirit of the invention, the scope of which is defined by the appended claims.

What is claimed is:

1. A plurality of toys for performing a simulated audible conversation therebetween, each of the toys comprising:

a) an architecture including a physical layer, a messenger layer and an application layer, said physical layer communicating with said application layer through said messenger layer;

b) said physical layer receiving and transmitting messages from and to compatible toys;

c) said messenger layer receiving and verifying messages from the physical layer and passing verified messages to the application layer, said messenger layer also receiving messages from the application layer and passing the messages from the application layer to the physical layer for transmission;

d) said application layer including:

i. a forest of decision graphs, each of which correspond to a conversation, the messages received from the messenger layer being used by the application layer to select a conversation from the forest of decision graphs;

ii. a participants list that lists the plurality of toys; and iii. an identification number of one of the plurality of toys that is designated as a conversation manager so that transmissions from the conversation manager relating to the participants list and the conversation are received by each toy that is not the conversation manager.

2. The plurality of toys of claim 1 wherein each of the decision graphs includes a number of nodes with at least some of the nodes corresponding to portions of the conversation.

3. The plurality of toys of claim 2 wherein each of said nodes including one or more contexts with each of the contexts corresponding to an edge leading to a child node so that a selection of a context by each toy directs progression of the simulated conversation between the plurality of toys.

4. The plurality of toys of claim 1 wherein the messenger layer includes:

a) a receiver component and a transmitter component so that when a message is received by the receiver component of a receiving toy, the transmitter component passes a message acknowledgement (MSG_ACK) containing a copy of at least a portion of the message to the physical layer for transmission to an originating toy that originally sent the message; and b) said messenger layer passing the message to the application layer upon receipt of an acknowledgement to the message acknowledgement (ACK_ACK) in response to the transmission of the message acknowledgement (MSG_ACK) indicating that the originating toy has verified proper receipt of the message by the receiving toy.

5. The plurality of toys of claim 1 wherein the physical medium is infrared and the physical layer includes infrared reception and transmission circuitry.

6. The plurality of toys of claim 1 wherein each of the decision graphs includes a number of nodes, each of which includes a node identification number, with at least some of the nodes corresponding to a portion of the conversation and said transmissions from the conversation manager relating to the conversation including an identification number for a node.

7. The plurality of toys of claim 1 wherein the messenger and application layers are implemented by micro-controllers.

8. The plurality of toys of claim 1 wherein the messenger and application layers are implemented by an application-specific integrated circuit chip.

9. The plurality of toys of claim 1 wherein the identification number of one of the plurality of toys that is designated as a conversation manager is a Global Identification Number.

10. A toy for performing a simulated conversation with at least one other compatible toy comprising:

a) a speaker;

b) a transmission and reception means;

c) a controller in communication with the speaker and the transmission and reception means; and d) said controller including:

i. at least one decision graph corresponding to a conversation between the toy and the compatible toy, said decision graph including a number of nodes with at least some of said nodes corresponding to portions of the conversation;

ii. a participants list that lists toys participating in the simulated conversation; and iii. an identification number of a toy that is designated as a conversation manager so that transmissions from the conversation manager relating to the participants list and the simulated conversation are received by the toy whereby said toy receives an information message from the compatible toy through the transmission and reception means, and uses said message to select a node of the decision graph so that a portion is played through the speaker and a message is transmitted to the compatible toy through the transmission and reception means.

11. The toy of claim 10 wherein each of the nodes includes one or more contexts with each of the contexts corresponding to an edge leading to a child node so that a selection of a context by the toy directs progression of the simulated conversation.

12. The toy of claim 10 wherein each of the nodes includes a node identification number, and the transmissions from the conversation manager relating to the simulated conversation include an identification number of a node of the decision graph.

13. The toy of claim 10 where the transmission and reception means includes infrared transmission and reception circuitry.

14. The toy of claim 10 wherein the controller is a micro-controller.

15. The toy of claim 10 wherein the controller is an application-specific integrated circuit chip.

16. The toy of claim 10 wherein the identification number of a toy that is designated as a conversation manager is a Global Identification Number.

17. A method for managing a simulated conversation between multiple toys, where the multiple toys include transmission and reception means, unique identification numbers and identical decision graphs with multiple nodes where the decision graphs correspond to conversations between the multiple toys and the multiple nodes correspond to portions of the conversations, said method comprising the steps of:

a) designating one of said toys, based on an identification number, as the conversation manager;

b) causing the conversation manager to select and broadcast a node of a decision graph to the multiple toys; and c) causing the conversation manager to broadcast a participants list including toys involved in the conversation to the multiple toys;

whereby all of the multiple toys are synchronized with regard to the selected node and participants list.

18. A plurality of toys for performing a simulated conversation there between comprising:

a) a first toy and a second toy, each including:

i. a transmission means;

ii. a reception means;

iii. a controller in communication with the speaker, transmission means and reception means and including at least one decision graph corresponding to the simulated conversation, said decision graph including a plurality of nodes with said plurality of nodes corresponding to portions of the simulated conversation; and b) said first toy selecting one of said plurality of nodes via its controller without manual intervention by a user and transmitting the selected node via its transmission means without manual intervention by a user to the reception means of the second toy, whereupon receipt, said second toy playing a portion of the simulated conversation corresponding to the selected node.

19. The plurality of toys of claim 18 wherein said first toy receives a message containing an earlier-selected node with its reception means prior to selecting the node for transmission to the second toy.

20. The plurality of toys of claim 18 wherein plurality is defined as including intra-series toys.

21. The plurality of toys of claim 20 wherein the first and second toys are duplicates of one another.

22. The plurality of toys of claim 21 wherein the first and second toys each have a unique Global Identification Number assigned thereto.

23. The plurality of toys of claim 20 further comprising a third toy where the third toy is a duplicate of the first toy.

24. The plurality of toys of claim 23 further comprising additional toys and wherein neither the first toy, the second toy nor any of the additional toys are duplicates of one another.

25. The plurality of toys of claim 18 wherein plurality is defined as including inter-series toys.

26. The plurality of toys of claim 23 wherein the first and second toys are of a different series and further comprising a third toy where the third toy is of the same series as the first toy.

27. The plurality of toys of claim 26 wherein the first and third toy are duplicates.

28. The plurality of toys of claim 27 further comprising a fourth toy that is the same series as the second toy.

29. The plurality of toys of claim 28 wherein the second toy and the fourth toy are duplicates.

30. The plurality of toys of claim 18 wherein each of said nodes includes one or more contexts with each of the contexts corresponding to an edge leading to a child node so that a selection of a context directs progression of the simulated conversation between the plurality of toys and wherein said first toy selects a context in addition to selecting a node and where the selected context is transmitted to the second toy along with the selected node.

31. The plurality of toys of claim 30 wherein the contexts are used by each toy in the selection of a node.

32. The plurality of toys of claim 30 wherein each of said first and second toys also includes a participants list that lists the plurality of toys, said participants list used by each toy in the selection of a node corresponding to a toy present in the participants list.

33. The plurality of toys of claim 32 wherein the participants list includes a doubtfuls list that lists toys that have been removed from the simulated conversation.

34. The plurality of toys of claim 30 wherein each of said contexts includes a probability assigned thereto and the probabilities are used by each toy in the selection of a node.

35. The plurality of toys of claim 30 wherein a default context is selected by the first toy at the beginning of the simulated conversation.

36. The plurality of toys of claim 18 wherein said decision graphs may be interchanged with alternative decision graphs.

37. A toy for performing a simulated conversation with at least one other toy comprising:

a) a transmission means;

b) a controller in communication with the transmission means and including at least one decision graph corresponding to the simulated conversation between the toy and the other toy, said decision graph including a plurality of nodes corresponding to portions of the simulated conversation where each of the nodes has a probability assigned thereto and each of the nodes includes one or more contexts with a probability assigned to each context and said controller also including a participants list; and c) said controller selecting one of said plurality of nodes based upon the context, the participants list, the probabilities of the contexts and the probabilities of the nodes and transmitting it to the other toy via the transmission means.

38. The toy of claim 37 wherein the participants list includes a doubtfuls list that lists toys that have been removed from the simulated conversation.

39. The toy of claim 37 further comprising a reception means and wherein the toy receives a message containing an earlier-selected node with the reception means prior to selecting the node for transmission to the other toy.

40. A toy for performing a simulated conversation with at least one other toy comprising:

a) a transmission means;

b) a controller in communication with the transmission means and including a participants list and at least one decision graph corresponding to the simulated conversation between the toy and the other toy, said decision graph including a plurality of nodes corresponding to portions of the simulated conversation where each of said nodes includes one or more contexts with each of the contexts corresponding to an edge leading to a child node so that a selection of a context directs progression of the simulated conversation; and c) said controller selecting one of said plurality of nodes using the participants list so that a node corresponding to a toy present in the participants list is selected and said controller also selecting a context of the selected node and transmitting the selected node and selected context to the other toy via the transmission means.

41. The toy of claim 40 wherein the contexts are used by the controller in the selection of a node.

42. The toy of claim 40 wherein the participants list includes a doubtfuls list that lists toys that have been removed from the simulated conversation.

43. The toy of claim 40 wherein each of said contexts includes a probability assigned thereto and the probabilities are used by the controller in the selection of a node.

44. The toy of claim 40 wherein a default context is selected by the toy at the beginning of the simulated conversation.

45. The toy of claim 37 wherein said decision graphs may be interchanged with alternative decision graphs.

46. A method for simulating a conversation between a first toy and a second toy comprising the steps of:

a) providing first and second toys, each including at least one decision graph corresponding to the simulated conversation between the first toy and the second toy, the decision graph including a plurality of nodes corresponding to portions of the simulated conversation;

b) the first toy selecting a node from the decision graph of the first toy without manual intervention by a user;

c) the first toy transmitting the selected node from the first toy to the second toy without manual intervention by a user;

d) the second toy receiving the selected node; and e) the second toy playing a portion of the simulated conversation corresponding to the selected node.

47. The method of claim 46 further comprising the steps of:

f) providing each node of the decision graph with at least one context;

g) providing each of the toys with a participants list;

h) providing each of the contexts with a probability;

i) providing each of the nodes with a probability;

and wherein step b) is based upon the participants list, the contexts and their associated probabilities and the nodes and their associated probabilities.

48. The method of claim 47 further comprising the step of selecting a default context at the beginning of the simulated conversation.

49. A method of managing a simulated conversation between a plurality of toys comprising the steps of:

a) providing each of the plurality of toys with a participants list, said participants list including a currently active toys list and a doubtfuls list;

b) including toys that are present in the simulated conversation in the currently active toys list;

c) placing toys that are removed from the simulated conversation on the doubtfuls list; and d) placing toys that are added to the simulated conversation on the currently active toys list.

* * * * *